United States Patent
Kang et al.

(10) Patent No.: US 9,324,336 B2
(45) Date of Patent: Apr. 26, 2016

(54) METHOD OF MANAGING A JITTER BUFFER, AND JITTER BUFFER USING SAME

(71) Applicant: LG Electronics Inc., Seoul (KR)

(72) Inventors: Ingyu Kang, Seoul (KR); Younghan Lee, Seoul (KR); Gyuhyeok Jeong, Seoul (KR); Hyejeong Jeon, Seoul (KR); Lagyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 14/353,044

(22) PCT Filed: Oct. 22, 2012

(86) PCT No.: PCT/KR2012/008670
§ 371 (c)(1),
(2) Date: Apr. 21, 2014

(87) PCT Pub. No.: WO2013/058626
PCT Pub. Date: Apr. 25, 2013

(65) Prior Publication Data
US 2014/0310008 A1    Oct. 16, 2014

Related U.S. Application Data

(60) Provisional application No. 61/706,053, filed on Sep. 26, 2012, provisional application No. 61/549,252, filed on Oct. 20, 2011.

(51) Int. Cl.
*G10L 19/26* (2013.01)
*G10L 19/00* (2013.01)
(Continued)

(52) U.S. Cl.
CPC .............. *G10L 19/265* (2013.01); *G10L 19/00* (2013.01); *H04J 3/0632* (2013.01); *G10L 19/167* (2013.01); *G10L 21/043* (2013.01)

(58) Field of Classification Search
CPC .............. H04L 29/06027; H04L 12/66; H04L 65/1069; H04L 12/2801; H04B 3/23
USPC .............. 370/516, 252, 394, 412, 429, 230.1, 370/401, 493, 503; 725/111; 704/500
See application file for complete search history.

(56) References Cited

U.S. PATENT DOCUMENTS 6,389,032 B1    5/2002    Cohen
7,266,127 B2    9/2007    Gupta et al.
(Continued)

FOREIGN PATENT DOCUMENTS

CN      1531276 A       9/2004
CN      101449545 A     6/2009
(Continued)

OTHER PUBLICATIONS

Office Action dated Mar. 3, 2015 for corresponding Japanese Patent Application No. 2014-537000, 2 pages.
(Continued)

*Primary Examiner* — Charlotte M Baker
(74) *Attorney, Agent, or Firm* — Fish & Richardson P.C.

(57) ABSTRACT

The present invention relates to a method of managing a jitter buffer and a jitter buffer using same. The method of managing a jitter buffer includes the steps of: receiving audio information frames; and adjusting a jitter buffer on the basis of the received audio information frames, wherein the adjusting step of the jitter buffer includes compensation of an audio signal, and the compensation of the audio signal can be performed for each sub frame of the audio information frames.

15 Claims, 22 Drawing Sheets

(51) Int. Cl.
   *H04J 3/06*   (2006.01)
   *G10L 21/043*   (2013.01)
   *G10L 19/16*   (2013.01)

(56) References Cited

U.S. PATENT DOCUMENTS

| | | | |
|---|---|---|---|
| 7,379,466 B2 * | 5/2008 | Kavaler | 370/412 |
| 7,570,670 B2 * | 8/2009 | Schwartz | 370/516 |
| 8,254,404 B2 * | 8/2012 | Rabenko et al. | 370/429 |
| 2003/0152093 A1 | 8/2003 | Gupta | |
| 2005/0232309 A1 | 10/2005 | Kavaler | |
| 2007/0268887 A1 | 11/2007 | Schwartz | |
| 2011/0077945 A1 | 3/2011 | Ojala | |

FOREIGN PATENT DOCUMENTS

| | | |
|---|---|---|
| EP | 1 103 953 A2 | 5/2001 |
| JP | 2001154699 A | 6/2001 |
| JP | 2005157045 A | 6/2005 |
| JP | 2008003177 A | 1/2008 |
| JP | 2009120297 A | 6/2009 |
| JP | 2009538040 T | 10/2009 |
| KR | 10-10 19925 B1 | 3/2011 |
| WO | WO2005117366 A1 | 12/2005 |
| WO | WO 2007/136533 A2 | 11/2007 |
| WO | WO2007136533 A3 | 1/2008 |
| WO | WO 2009/010831 A1 | 1/2009 |

OTHER PUBLICATIONS

Ohmuro et al., "Improvement of Speech Quality Under Burst Packet Loss Conditions Using Parallel Transmission of Speech Feature Parameters", Technical Report of IEICE, SP2004-77 (Nov. 2004), vol. 104, vol. 470, pp. 35-40 (including English Abstract).
International Search Report dated Mar. 27, 2013 for Application No. PCT/KR2012/008670 with English Translation, 4 pages.
European Search Report dated Jul. 2, 2015 for Application No. EP12841733, 7 Pages.
Chinese Office dated Aug. 25, 2015 for Chinese Application No. 201280061772.5, 7 Pages.

* cited by examiner

FIG. 13
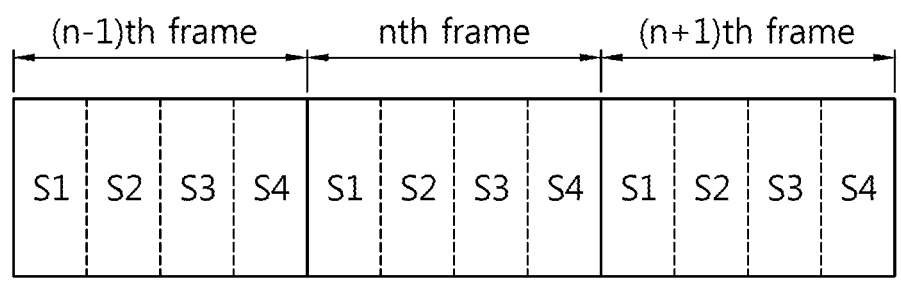
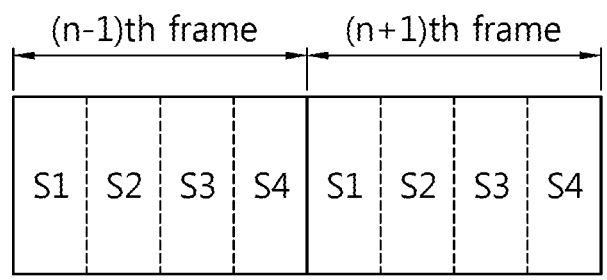

FIG. 15
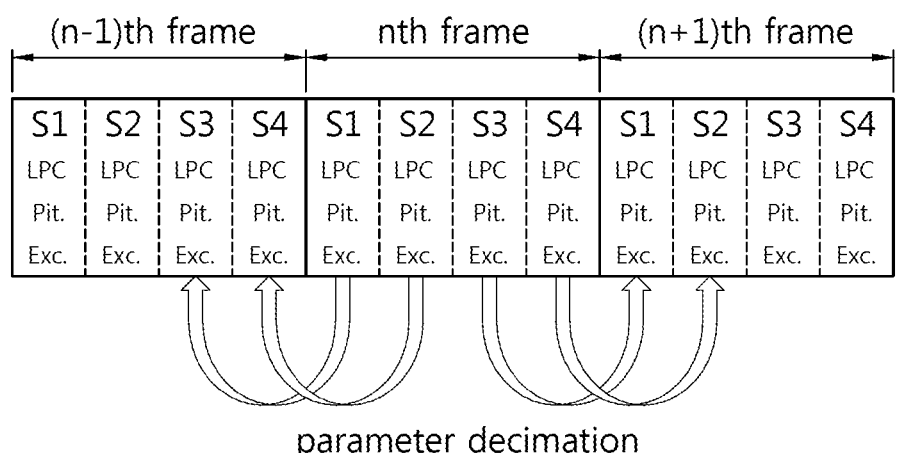
parameter decimation
(a)
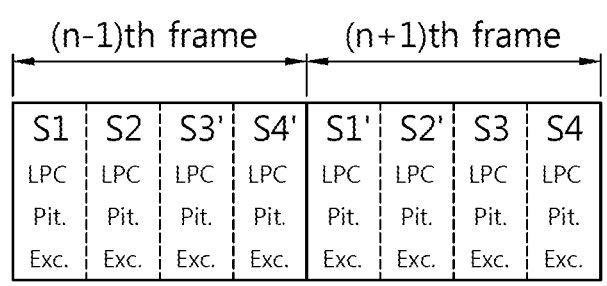
(b)

METHOD OF MANAGING A JITTER BUFFER, AND JITTER BUFFER USING SAME

CROSS REFERENCE TO RELATED APPLICATIONS

This application is a U.S. National Phase Application under 35 U.S.C. §371 of International Application PCT/KR2012/008670, filed on Oct. 22, 2012, which claims the benefit of U.S. Provisional Application No. 61/549,252, filed on Oct. 20, 2011 and U.S. Provisional Application No. 61/706,053, filed on Sep. 26, 2012, the entire content of the prior applications is hereby incorporated by reference.

TECHNICAL FIELD

The present invention relates to a technique of processing an audio signal, and more particularly, to a method of managing/controlling a jitter buffer of a receiving end for decoding, and a jitter buffer using the method.

BACKGROUND ART

In general, an audio signal includes a signal of various frequency bands. A human audible frequency is in the range of 20 Hz to 20 kHz, whereas a common human voice is in a frequency band equal to or less than about 4 kHz.

There may be a case where an input audio signal includes a component of a high frequency band greater than or equal to 7 kHz in which a human voice is difficult to exist, as well as a band in which a human voice exists.

As such, if a coding scheme suitable for a narrowband (e.g., ~4 kHz) is applied to a signal of a wideband (about ~8 kHz) or a super wideband (about ~16 kHz), there is a problem in that sound quality deteriorates due to a band which is not encoded.

Recently, with an increased demand on video telephony, video conference, etc., there is a growing interest on an encoding/decoding technique by which an audio signal, that is, a speech signal, is restored to be close to an actual voice. More specifically, there is a growing interest on an encoding/decoding technique by which an encoding band is extended, and also, in a network for transmitting voice information, an interest region is moved from a circuit switching network scheme to a packet switching network scheme.

In this case, a delay may occur in a process of transmitting an audio signal which is packetized by the use of encoding due to a problem on a network. The delay occurring in the transmission process results in an output delay or a sound quality deterioration in an output end.

Accordingly, there is a need to consider a method to be used in a receiving end to solve an audio signal delay or loss problem occurring in the transmission process.

SUMMARY OF INVENTION

Technical Problem

The present invention provides a method and apparatus for performing a jitter buffer control by giving a weight on the basis of an importance of a voice packet at a time of requiring the jitter buffer control.

The present invention also provides a method and apparatus for assigning a priority for a target to be processed on the basis of an importance of a voice packet in a voice information adjustment.

The present invention also provides a method and apparatus for avoiding a sound quality deterioration as well as facilitating a playback through a jitter buffer control by dropping or restoring a voice packet with a priority assigned to a silent duration.

The present invention also provides a method and apparatus for preferentially dropping/restoring a voice packet in a silent duration or for performing a jitter buffer management by compressing an audio signal in consideration of a fact that an influence exerted on sound quality is less significant than a case of processing the silent duration when the silent duration is processed.

The present invention also provides a method and apparatus in which, if a voice packet having a higher priority (e.g., a voice packet having a low importance) does not exist when determined on the basis of the importance, a jitter buffer control request is stored in an event stack and is transmitted to a playback end in an rearrangement order based on a sequence number of a time stamp.

Technical Solution

According to an aspect of the present invention, a method of managing a jitter buffer is provided. The method includes: receiving a voice information frame; and performing a jitter buffer adjustment on the basis of the received voice information frame, wherein the jitter buffer adjustment comprises a compensation for an audio signal.

In addition, the compensation for the audio signal may be performed in unit of a subframe of the voice information frame.

In addition, the compensation for the audio signal may be performed at a decoding parameter level of the audio signal.

In addition, the compensation for the audio signal may be performed based on an importance of the audio signal frame. Herein, the audio signal may become a target of the audio signal compensation in an ascending order of the importance, and the audio signal frame may have a lowest importance in a continuous silent duration.

In addition, if a frame decimation is performed as the compensation for the audio signal, a new decoding parameter of a subframe may be generated by interpolating decoding parameters for two subframes constituting an audio signal frame.

In addition, if a frame decimation is performed as the compensation for the audio signal, a decoding parameter of a new subframe may be generated by interpolating decoding parameters for two subframes constituting an audio signal frame.

In addition, if a frame decimation is performed as the compensation for the audio signal, a subframe interpolation may be performed, and the subframe interpolation may include: generating a new subframe between two subframes constituting an audio signal frame, and generating a decoding parameter of the new subframe by interpolating decoding parameters for the two subframes.

According to another aspect of the present invention, there is provided a jitter buffer including: a receiver for receiving a voice information frame; a buffer for storing and managing the voice information frame; and an output unit for outputting the voice information frame, wherein the buffer compensates for voice information in unit of a subframe of the received voice information frame.

In addition, the buffer may compensate for the voice information at a decoding parameter level.

In addition, the buffer may generate a new decoding parameter by interpolating decoding parameters of two different subframes.

Advantageous Effects

According to the present invention, performance can be improved by giving a weight on the basis of an importance of a voice packet at a time when a jitter buffer control is required. For example, a priority for a target to be processed can be determined on the basis of an importance in a voice information adjustment.

According to the present invention, an influence exerted on sound quality in a jitter buffer management can be decreased by performing the jitter buffer management on the basis of an importance of a specific criterion.

According to the present invention, a sound quality deterioration can be decreased, and also a playback can be facilitated through a jitter buffer management by dropping or restoring a voice packet with a priority assigned to a silent duration.

According to the present invention, in consideration of a fact that an influence exerted on sound quality is less significant than a case of processing a silent duration when the silent duration is processed, a jitter buffer management can become more effective by preferentially dropping/restoring a voice packet of the silent duration.

According to the present invention, a high-quality voice service less influenced by a jitter buffer management can be provided by giving a priority to the dropping/restoring of a packet and/or to the compressing/extending of an audio signal on the basis of an importance of a packet in a jitter buffer.

According to the present invention, if a voice packet having a higher priority (e.g., a voice packet having a low importance) does not exist when determined on the basis of the importance, a jitter buffer control request can be stored in an event stack and can be transmitted to a playback end in an rearrangement order based on a sequence number of a time stamp.

DESCRIPTION OF DRAWINGS

FIG. 13 is a schematic view showing an example of performing a jitter buffer management at a bit-stream level.

FIG. 15 is a schematic view showing an example of compensating for voice information in unit of a subframe of a voice frame.

MODE FOR INVENTION

Hereinafter, exemplary embodiments of the present invention will be described in detail with reference to the accompanying drawings. In the following description of the exemplary embodiments of the present invention, well-known functions or constructions are not described in detail since they would obscure the invention in unnecessary detail.

When a first constitutional element is mentioned as being "connected" to or "accessing" a second constitutional element, this may mean that it is directly connected to or accessing the second constitutional element, or it is to be understood that it is connected to or accessing the second constitutional element by means of a third constitutional element.

The terms "first", "second", etc., may be used to distinguish one technical construction from another technical construction. For example, a constitutional element named as the first constitutional element within the scope of the technical features of the present invention may also be named as the second constitutional element to perform the same function.

Figure 1:
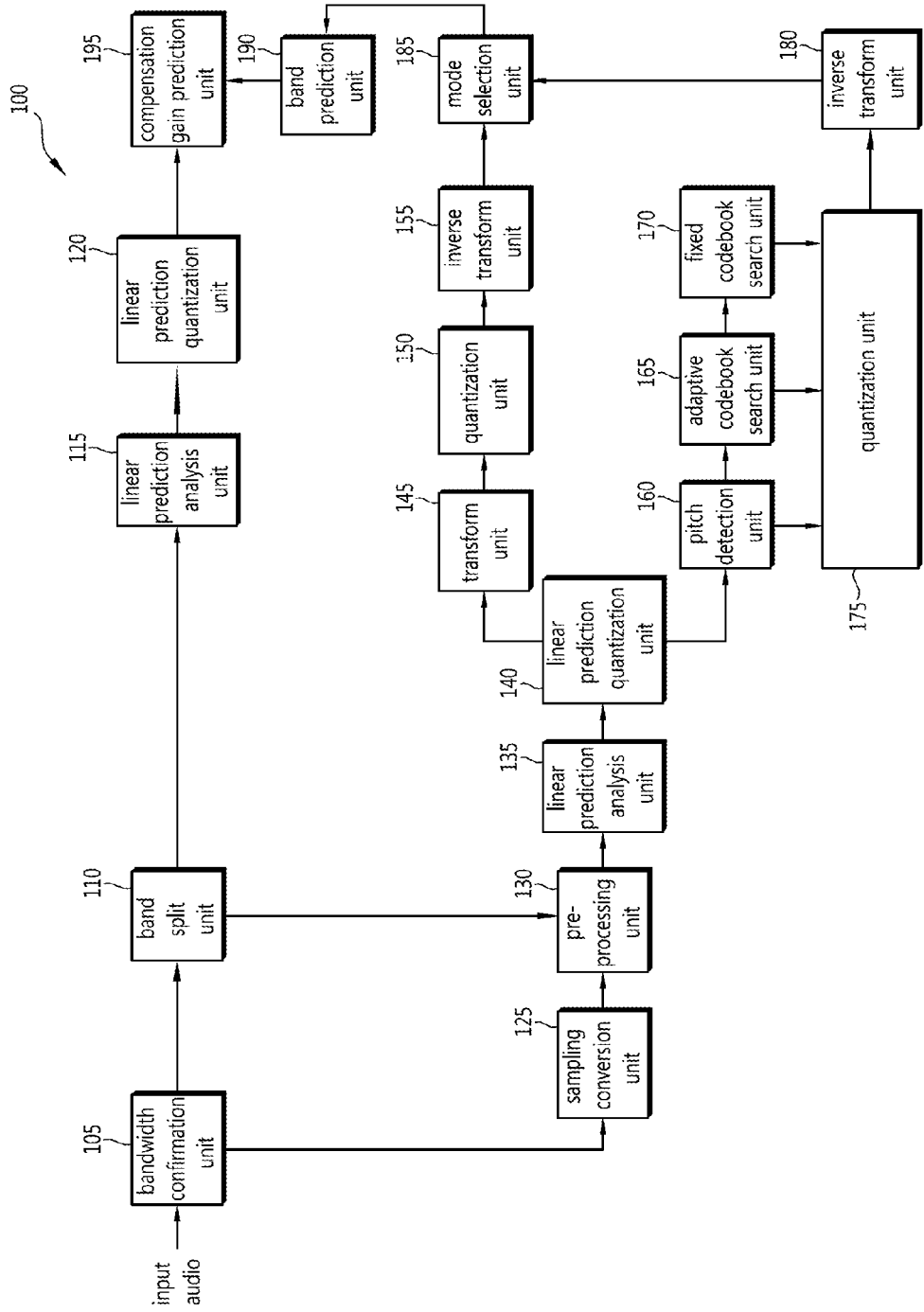
FIG. 1 is a block diagram showing an exemplary structure of a typical audio encoder.

FIG. 1 is a block diagram showing an exemplary structure of a typical audio encoder.

Referring to FIG. 1, an audio encoder 100 may include a bandwidth confirmation unit 105, a sampling conversion unit 125, a pre-processing unit 130, a band split unit 110, linear prediction analysis units 115 and 135, linear prediction quantization units 120 and 140, quantization units 150 and 175, a transform unit 145, inverse transform units 155 and 180, a pitch detection unit 160, an adaptive codebook search unit 165, a fixed codebook search unit 170, a mode selection unit 185, a band prediction unit 190, and a compensation gain prediction unit 195.

The bandwidth confirmation unit 105 may determine bandwidth information of an input audio signal. The audio signal may be classified according to a bandwidth, such as a narrowband signal having a bandwidth of about 4 kHz and mainly used in a public switched telephone network (PSTN), a wideband signal having a bandwidth of about 7 kHz and mainly used in AM radio or a high-quality speech which is more natural than the narrowband audio signal, a super wideband signal mainly used in a sector in which sound quality is important such as digital broadcasting. The bandwidth confirmation unit 105 may change the input audio signal into a frequency-domain signal to determine whether a bandwidth of a current audio signal corresponds to a narrowband signal or a wideband signal or a super wideband signal. The bandwidth confirmation unit 105 may convert the input audio signal into a frequency-domain signal to determine whether upper-band bins of a spectrum exists and/or may examine and determine a component thereof. According to implementation, the bandwidth confirmation unit 105 may not be separately provided when the bandwidth of the input audio signal is fixed.

According to the bandwidth of the input audio signal, the bandwidth confirmation unit 105 may transmit the super wideband signal to the band split unit 110, and may transmit the narrowband signal or the wideband signal to the sampling conversion unit 125.

The band split unit 110 may convert a sampling rate of an input signal, and may split it into an upper band and a lower band. For example, an audio signal of 32 kHz may be converted into a sampling frequency of 25.6 kHz, and may be converted by 12.8 kHz into an upper band and a lower band. Among the split bands, the band split unit 110 transmits a lower-band signal to the pre-processing unit 130, and transmits an upper-band signal to the linear prediction analysis unit 115.

The sampling conversion unit 125 may receive the input narrowband signal or wideband signal, and may change a specific sampling rate. For example, if a sampling rate of the input narrowband audio signal is 8 kHz, the upper-band signal may be generated by performing up-sampling to 12.8 kHz, and if the input wideband audio signal is 16 kHz, a lower-band signal may be created by performing down-sampling to 12.8 kHz. The sampling conversion unit 125 outputs the sampling-converted lower-band signal. An internal sampling frequency may have another sampling frequency other than 12.8 kHz.

The pre-processing unit 130 performs pre-processing on the lower-band signal which is output from the sampling conversion unit 125 and the band split unit 110. The pre-processing unit 130 performs filtering on an input signal so that an audio parameter is effectively extracted. A cutoff frequency may be set differently according to a voice bandwidth, and high-pass filtering may be performed on a very low frequency which is a frequency band in which relatively less important information is gathered, thereby being able to concentrate on a critical band required when extracting a parameter. For another example, pre-emphasis filtering may be used to boost a high frequency band of an input signal, so that energy of a low frequency region and a high frequency region can be scaled. Therefore, resolution can be increased when analyzing linear prediction.

The linear prediction analysis units 115 and 135 may calculate a linear prediction coefficient (LPC). The linear prediction analysis units 115 and 135 may perform modeling on a Formant which indicates an overall shape of a frequency spectrum of an audio signal. The linear prediction analysis units 115 and 135 may calculate an LPC value to have a smallest mean square error (MSE) of an error value indicating a difference of a prediction audio signal generated by using an original audio signal and the LPC calculated by the linear prediction analysis units 115 and 135. The LPC may be calculated by using various methods such as an auto-correction method, a covariance method, etc.

The linear prediction analysis unit 115 may extract a low-order LPC, unlike the linear prediction analysis unit 135 for a lower-band signal.

The linear prediction quantization units 120 and 140 may convert the extracted LPC to generate transform coefficients of a frequency domain such as a linear spectral pair (LSP) or a linear spectral frequency (LSF), and may quantize the generated transformed value of the frequency domain. Since the LPC has a large dynamic range, many bits are required when the LPC is directly transmitted. Therefore, LPC information can be transmitted with a small number of bits (i.e., a compression amount) by converting to the frequency domain and by quantizing the transform coefficient.

The linear prediction quantization units 120 and 140 may de-quantize the quantized LPC and generate a linear prediction residual signal by using an LPC converted to a time domain. The linear prediction residual signal is a signal of which a predicted Formant component is excluded from an audio signal, and may include pitch information and a random signal.

The linear prediction quantization unit 120 may use the quantized LPC to generate a previous prediction residual signal through filtering with respect to an original upper-band signal. The generated linear prediction residual signal is transmitted to the compensation gain prediction unit 195 to obtain a compensation gain with respect to an upper-band prediction excitation signal.

The linear prediction quantization unit 140 uses the quantized LPC to generate a linear prediction residual signal through filtering with respect to an original lower-band signal. The generated linear prediction residual signal is input to the transform unit 145 and the pitch detection unit 160.

In FIG. 1, the transform unit 145, the quantization unit 150, and the inverse transform unit 155 may operate as a transform coded excitation (TCX) mode execution unit for performing a TCX mode. In addition, the pitch detection unit 160, the adaptive codebook search unit 165, and the fixed codebook search unit 170 may operate as a code excited linear prediction (CELP) mode execution unit for performing a CELP mode.

The transform unit 145 may convert an input linear prediction residual signal to a frequency domain, on the basis of a transform function such as discrete Fourier transform (DFT) or fast Fourier transform (FFT). The transform unit 145 may transmit transform coefficient information to the quantization unit 150.

The quantization unit 150 may perform quantization on transform coefficients generated by the transform unit 145. The quantization unit 150 may perform quantization by using various methods. The quantization unit 150 may selectively perform quantization according to a frequency band, and may calculate an optimal frequency combination by using Analysis by Synthesis (AbS).

The inverse transform unit 155 may perform inverse transform on the basis of quantized information, and may generate a restored excitation signal of a linear prediction residual signal in a time domain.

A linear prediction residual signal which is inverse-converted after quantization, that is, a restored excitation signal, is restored as an audio signal through linear prediction. The restored audio signal is transmitted to the mode selection unit 185. As such, an audio signal restored in the TCX mode may be compared with an audio signal, which is quantized in a CELP mode and is restored, as described below.

Meanwhile, in the CELP mode, the pitch detection unit 160 may calculate a pitch for a linear prediction residual signal by using an open-loop scheme such as an autocorrelation method. For example, the pitch detection unit 160 may calculate a pitch period, a peak value, etc., by comparing a composite audio signal and an actual audio signal. In this case, a method of AbS or the like may be used.

The adaptive codebook search unit 165 extracts an adaptive codebook index and gain on the basis of pitch information calculated from the pitch detection unit. The adaptive codebook search unit 165 may calculate a pitch structure from a linear prediction residual signal on the basis of the adaptive codebook index and gain information by using AbS or the like. The adaptive codebook search unit 165 transmits a linear prediction residual signal in which a contributory portion of an adaptive codebook, e.g., information on a pitch structure, is excluded to the fixed codebook search unit 170.

The fixed codebook search unit 170 may extract and encode a fixed codebook index and gain on the basis of a linear prediction residual signal received from the adaptive codebook search unit 165. In this case, the linear prediction residual signal used to extract the fixed codebook index and gain from the fixed codebook search unit 170 may be a linear prediction residual signal in which information on a pitch structure is excluded.

The quantization unit 175 quantizes a parameter such as pitch information which is output from the pitch detection unit 160, the adaptive codebook index and gain which are output from the adaptive codebook search unit 165, and the fixed codebook index and gain which are output from the fixed codebook search unit 170, etc.

The inverse transform unit 180 may generate an excitation signal which is a linear prediction residual signal by using information quantized by the quantization unit 175. An audio signal may be restored by using a reverse process of linear prediction on the basis of the excitation signal.

The inverse transform unit 180 may transmit an audio signal restored in a CELP mode to the mode selection unit 185.

The mode selection unit 185 may compare a TCX excitation signal restored through the TCX mode and a CELP excitation signal restored through the CELP mode and may select a signal which is more similar to an original linear prediction residual signal. The mode selection unit 185 may also encode information indicating a specific mode through which the selected excitation signal is restored. The mode selection unit 185 may transmit an excitation signal and selection information regarding a selection of a restored audio signal to the band prediction unit 190.

The band prediction unit 190 may generate an upper-band prediction excitation signal by using the restored excitation signal and the selection information transmitted from the mode selection unit 185.

The compensation gain prediction unit 195 may compare an upper-band prediction excitation signal transmitted from the band prediction unit 190 and an upper-band prediction residual signal transmitted from the linear prediction quantization unit 120 to compensate for a gain on a spectrum.

Meanwhile, in the example of FIG. 1, each constitutional elements may operate as a separate module, or a plurality of constitutional elements may operate by forming one module. For example, the quantization units 120, 140, 150, and 175 may perform respective operations as one module, and each of the quantization units 120, 140, 150, and 175 may be provided at a location required for a processor as an additional module.

Figure 2:
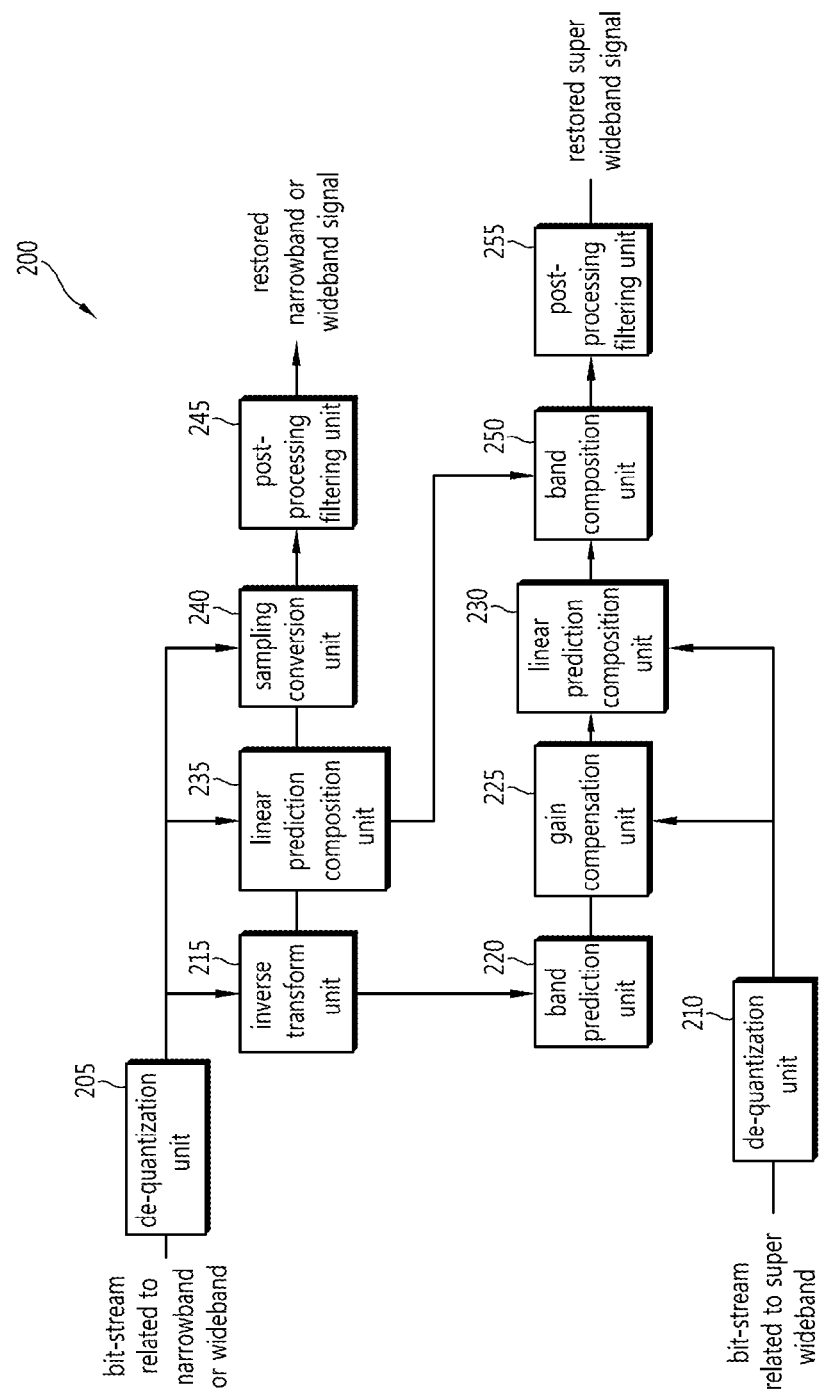
FIG. 2 is a block diagram showing an exemplary structure of a typical audio decoder.

FIG. 2 is a block diagram showing an exemplary structure of a typical audio decoder.

Referring to FIG. 2, an audio decoder 200 may include de-quantization units 205 and 210, a band prediction unit 220, a gain compensation unit 225, an inverse transform unit 215, linear prediction composition units 230 and 235, a sampling conversion unit 240, a band composition unit 250, and post-processing filtering units 245 and 255.

The de-quantization units 205 and 210 receive quantized parameter information from an audio encoder, and de-quantizes it.

The inverse transform unit 215 may restore an excitation signal by performing inverse-transform on voice information encoded in a TCX mode or a CELP mode. The inverse transform unit 215 may generate the restored excitation signal on the basis of a parameter received from the encoder. In this case, the inverse transform unit 215 may perform inverse transform only for some bands selected from the audio encoder. The inverse transform unit 215 may transmit the restored excitation signal to the linear prediction composition unit 235 and the band prediction unit 220.

The linear prediction composition unit 235 may restore a lower-band signal by using the excitation signal transmitted from the inverse transform unit 215 and a linear prediction coefficient transmitted from the audio encoder. The linear prediction composition unit 235 may transmit the restored lower-band signal to the sampling conversion unit 240 and the band composition unit 250.

The band prediction unit 220 may generate an upper-band prediction excitation signal on the basis of a restored excitation signal value received from the inverse transform unit 215.

The gain compensation unit 225 may compensate for a gain on a spectrum with respect to a super wideband audio signal on the basis of an upper-band prediction excitation signal received from the band prediction unit 220 and a compensation gain value transmitted from the encoder.

The linear prediction composition unit 230 receives the compensated upper-band prediction excitation signal value from the gain compensation unit 225, and may restore an upper-band signal on the basis of the compensated upper band prediction excitation signal value and a linear prediction coefficient value received from the audio encoder.

The band composition unit 250 may receive a restored lower-band signal from the linear prediction composition unit 235, and may receive a restored upper-band signal from a linear prediction composition unit 230, thereby being able to perform a band composition for the received upper-band signal and lower-band signal.

The sampling conversion unit 240 may convert an internal sampling frequency value back to an original sampling frequency value.

The post-processing filtering units 245 and 255 may perform post-processing required for signal restoration. For example, the post-processing filtering units 245 and 255 may include a de-emphasis filter capable of performing inverse-filtering on a pre-emphasis filter in a pre-processing unit. The post-processing filtering units 245 and 255 may perform not only filtering but also several post-processing operations, for example, of minimizing a quantization error or of eliminating a valley while maintaining a harmonic peak of a spectrum. The post-processing filtering unit 245 may output a restored narrow band or wideband signal, and the post-processing filtering unit 255 may output a restored super wideband signal.

As described above, the audio encoder illustrated in FIG. 1 and FIG. 2 is one example used in the present invention, and can be variously applied within a scope of the technical features of the present invention.

As described above, the encoder extracts parameters from the input audio signal, quantizes the parameters, and transmits the parameters as a packet. The decoder receives the packet transmitted from the encoder, and performs decoding for restoring the audio signal on the basis of the received packet. In this case, a parameter, which is extracted/transmitted from the audio signal and is then received/decoded, includes an excitation signal, a pitch period, and an LPC coefficient. Since it is difficult to quantize the LPC coefficient, it may be transmitted by being converted into an immittance spectral pairs (ISP) coefficient corresponding to the LPC coefficient in a 1:1 manner.

A Formant component of the audio signal may be subjected to modeling by using linear prediction (LP). In addition thereto, a residual signal part may be subjected to modeling by using pitch search. A residual part remaining after the pitch search may be compensated for by using an excitation signal based on a codebook.

At a give time point, the audio signal may be approximated by a linear combination of a previous audio signal, that is, by linear prediction, and an error between a signal resulted from the linear prediction and an original signal may be compensated for by using an excitement signal.

In this case, a gain or coefficient applied to previous audio samples in linear prediction is called a linear prediction (LP) or linear prediction coding (LPC) coefficient. As described above, for quantization, the LPC coefficient may be converted into an ISP coefficient. The ISP is obtained by converting an LPC parameter (i.e., LPC coefficient). For example, the ISP coefficient may be roots of a polynomial obtained by separating from a transfer function having an odd symmetry and a transfer function having an even symmetry.

In addition to the ISP coefficient, other coefficients converted from the LPC coefficient may be used in audio signal encoding/decoding. For example, in addition to the ISP coefficient, a line spectral pair (LSP) coefficient, an immittance spectral frequencies (ISF) coefficient, a line spectral frequencies (LSF) coefficient, etc., may be used.

Similarly to the ISP coefficient, the LSP coefficient may be roots of an odd-symmetry transfer function and an even-symmetry transfer function which are created by constituting a summation-polynomial and a subtraction-polynomial by the use of an inverse filter function on the basis of the LPC coefficient.

The LSP and the ISP may be distinguished according to the number of terms of the above constructed polynomial in consideration of the number of roots to be obtained. For example, the LSP may be used when a $10^{th}$-order LPC coefficient is converted, and the ISP may be used when a $16^{th}$-order LPC coefficient is converted.

The ISF coefficient and the LSF coefficient are values obtained by mapping the ISP and the LSP to a cosine domain.

In addition, a previous audio signal may be selected for each pitch period. A pitch implies, for example, a frequency of peaks which appear periodically in a time axis, and has the same frequency as a basis frequency of the audio signal. The pitch period may be determined based on a lag which is discovered by using loop search (i.e., AbS) for minimizing an error.

An excitation signal may be regarded as a residual signal for compensating for an error between an original audio signal and an audio signal resulted from linear prediction. The excitation signal may be designated by using a codebook.

An encoder may transmit information regarding an LPC coefficient per frame (e.g., an ISP coefficient for deriving the LPC coefficient), information regarding a pitch period (e.g., a pitch lag for deriving the pitch period), information regarding an excitation signal (e.g., a codebook index and codebook gain for deriving the excitation signal) by performing quantization and encoding thereon.

A decoder may restore an audio signal on the basis of the LPC coefficient derived from the ISP coefficient and the excitation signal and the pitch information. The decoder may generate an excitation signal on the basis of a codebook index and gain among information received from the encoder, and may generate a pitch period on the basis of a pitch lag and gain. The decoder may generate an excitation signal by acquiring pitch information, a gain, and position and sign information from the codebook.

As a codebook for deriving the pitch period and the excitation signal, an algebraical codebook or an adaptive/fixed codebook may be used. The adaptive codebook includes excitation signal information (i.e., excitation signal vector) suitable for each subframe, and a lag value for the pitch period may be derived from an index of the adaptive codebook. The fixed codebook includes excitation vectors for a speech composition filter, and content included therein may have a fixed value.

The decoder may also generate an LPC coefficient by converting an ISP coefficient. The LPC coefficient may be derived by reversely applying the aforementioned process for converting the ISP.

The decoder may restore an audio signal by compositing a restored signal (e.g., LPC coefficient, pitch period, excitation signal, etc.).

Hereinafter, a parameter (e.g., an LPC coefficient or ISP coefficient, a pitch period, an excitation signal, etc.) required to decode the audio signal is called a decoding parameter in the present invention.

As described below, the audio signal may be output to an output/playback device via a jitter buffer after being decoded from the decoder. In addition, the audio signal may be output to an audio output/playback device after being decoded from the decoder via the jitter buffer. In addition, the audio signal may be processed in parallel in the jitter buffer and the decoder. When the audio signal is processed in parallel, the audio signal may be stored/managed in the jitter buffer, and may be decoded in the decoder, while information required for storing/managing of the jitter buffer and information required for decoding of the decoder may be transmitted/received between the jitter buffer and the decoder.

Figure 3:
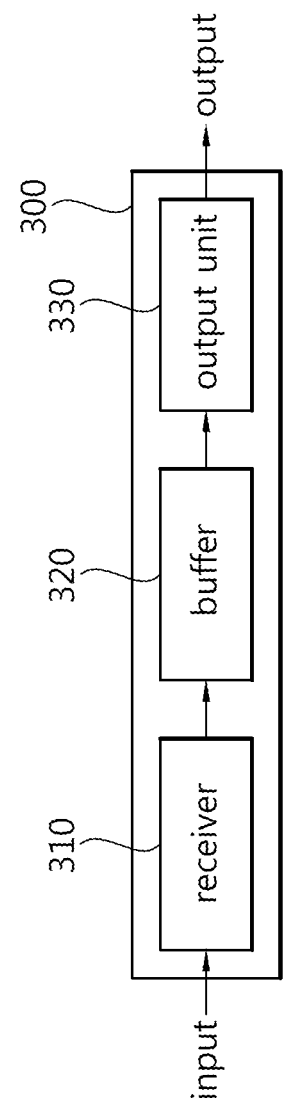
FIG. 3 is a block diagram showing an exemplary structure of a jitter buffer.

FIG. 3 is a block diagram showing an exemplary structure of a jitter buffer. Referring to FIG. 3, a jitter buffer 300 may include a receiver 310, a buffer 320, and an output unit 330.

The receiver 310 may receive an audio signal. The received audio signal may be a voice packet or a voice frame. The receiver 310 may receive the audio signal from an encoder, and may receive the audio signal via a decoder.

The buffer 320 may store and manage the audio signal. The audio signal to be stored and managed may be a voice packet or a voice frame.

The output unit 330 may output the audio signal according to a playback time. The audio signal to be output may be a voice packet or a voice frame. The output unit 330 may output the audio signal buffered in the jitter buffer to the decoder, and may output the audio signal to a playback device (i.e., output device).

Although it is described herein for convenience of explanation that the jitter buffer 300 includes three components, the present invention is not limited thereto. Thus, the jitter buffer itself may receive, manage/process, and output the audio signal.

The jitter buffer is a buffer for handling a problem related to a data jitter which occurs on a network.

The jitter implies a variable network delay which occurs when a voice packet packetized by encoding voice information is arrived to a destination (e.g., decoder), and may be generated on a network on which the packet is transmitted. For example, the jitter may occur due to several reasons such as a queue in a router for determining a packet priority and/or a collision between LANs. Therefore, the voice packet may not be arrived with a specific interval, and the jitter buffer is used to solve a problem which may occur in this case.

In other words, it can be said that one of purposes of using the jitter buffer is to adjust irregularity of data to be input.

Figure 4:
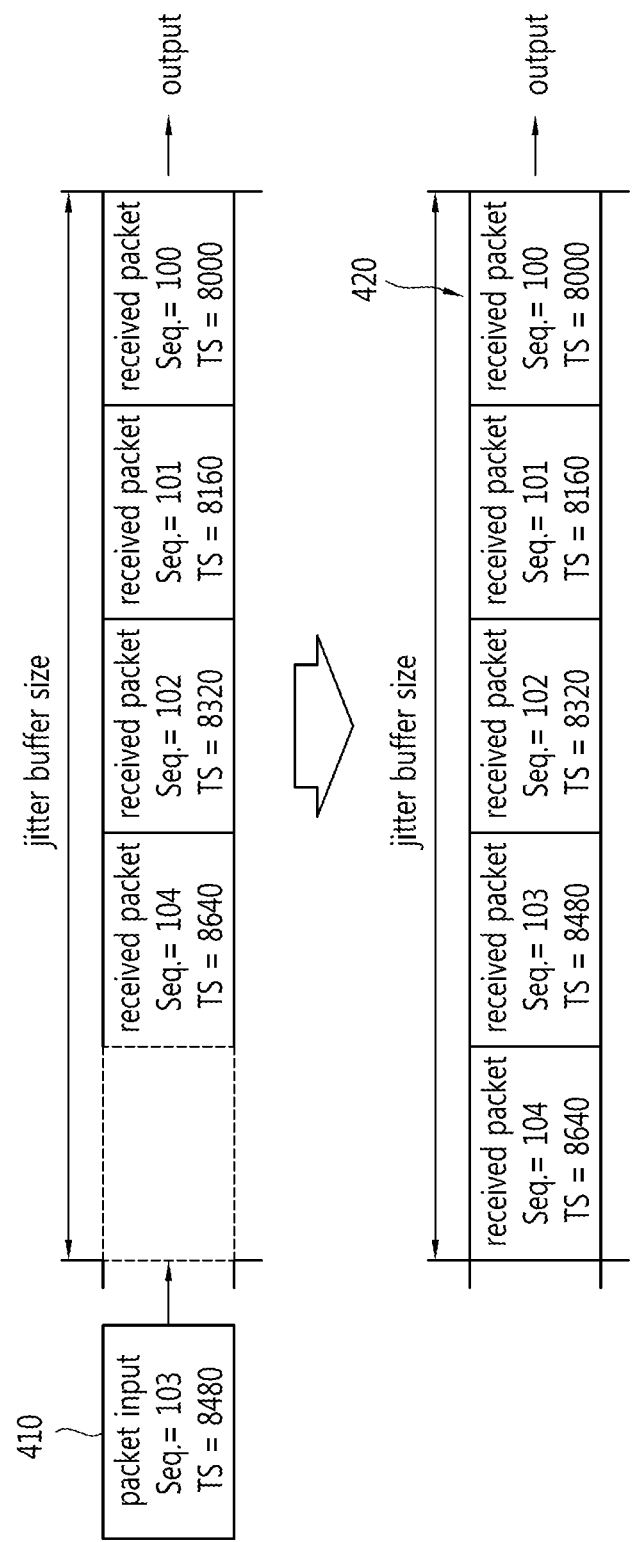
FIG. 4 is a schematic view showing an exemplary embodiment of a typical jitter buffer.

FIG. 4 is a schematic view showing an exemplary embodiment of a typical jitter buffer. A case where a buffer of the jitter buffer has a size capable of queuing 5 voice packets is exemplified in FIG. 4.

The jitter buffer may perform queuing on voice packets in the buffer (or queue) and interpret an order and interval for generating a voice packet by using real-time transport protocol (RTP) header information of the voice packets, and may rearrange the voice packets sequentially in the buffer on the basis of the interpretation.

Referring to FIG. 4, in a case where the voice packets received in the jitter buffer are arranged in an order of a packet of a sequence 100 (i.e., time stamp (TS) 8000), a packet of a sequence 101 (i.e., TS 8160), a packet of a sequence 102 (i.e., TS 8320), and a packet of a sequence 104 (i.e., TS 8640) in the buffer (or queue), if a packet 410 of a sequence 103 (i.e., TS 8480) is input, the jitter buffer rearranges the orders of the packet of the sequence 103 and the packet of the sequence 104 by considering a generation order of the packets.

The voice packets in the jitter buffer are output in an orderly manner from a packet 420 having a top priority.

The jitter buffer decimates or generates an audio signal and thus can solve a problem caused by a delayed reception or loss, etc. In addition, the jitter buffer may decrease or increase a size of the jitter buffer by considering a length of an audio signal which is on standby.

When the jitter buffer is not used, there is a problem in that it is difficult to constantly maintain a playback time of the audio signal.

Figure 5:
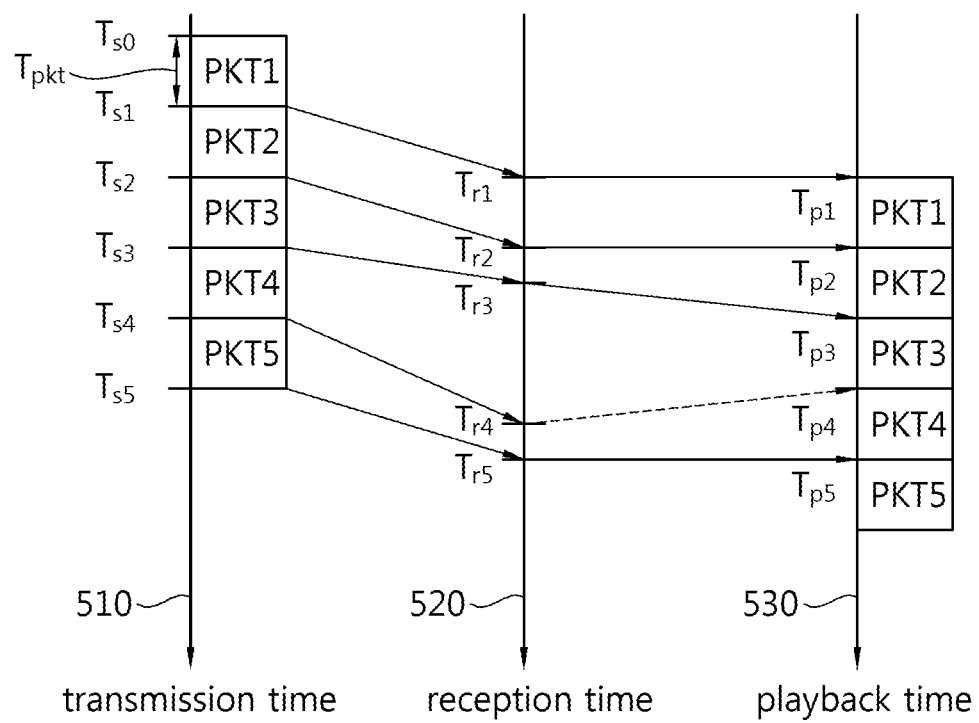
FIG. 5 is a schematic view showing an example of not using a jitter buffer.

FIG. 5 is a schematic view showing an example of not using a jitter buffer. Referring to FIG. 5, five voice packets PKT1 to PKT5 are transmitted in an orderly manner in a transmitting side of the voice packets.

A transmission time for transmitting the voice packets in a transmitting end is indicated on a transmission time axis 510. For example, the voice packets PKT1 to PKT5 are transmitted at respective transmission times $T_{s1}$ to $T_{s5}$ with a time interval $T_{pkt}$. In this case, the time interval $T_{pkt}$ may be a playback time of each voice packet.

A reception time for receiving the voice packets in a receiving end is indicated on a reception time axis 520. For example, the voice packets PKT1 to PKT5 are received at respective reception times $T_{r1}$ to $T_{r5}$. As illustrated, the received voice packets may be influenced by various delay factors in a transmission process, and may not be received with a specific time interval.

A playback time for playing back each voice packet in a playback end is indicated on a playback time axis 530. For example, the voice packets PKT1 to PKT5 must be output at playback times $T_{p1}$ to $T_{p5}$ with a playback time interval $T_{pkt}$. However, the voice packets may not be received with a specific time interval. Thus, as illustrated, the voice packet PKT3 and the voice packet PKT4 may be received with a time interval greater than the playback time $T_{pkt}$.

Considering the example of FIG. 5, since the packet PKT4 is not received at a time $T_{p4}$ for playing back the packet PKT4 in the playback end, the packet PKT4 cannot be played back in the playback end, which may cause a sound quality deterioration.

In other words, in a case where the jitter buffer is not used, a reception time $T_{rX}$ of an $X^{th}$ voice packet may be later than a playback time $T_{pX}$, which may result in a sound quality deterioration.

In order to solve a problem of an inversion between a reception time and a playback time or a playback delay/disable, the jitter buffer queues sufficient voice packets, and prepares for a periodical packet request in the playback end. A voice packet received first in the jitter buffer such as the packet 420 of FIG. 4 may be first output in response to the playback request.

The jitter buffer may compensate for a voice packet according to an interval/time for generating each voice packet on the basis of RTP header information of voice packets. For example, voice packets having the same generation interval may be generated, and at least one of the voice packets in the same time domain may be decimated. Accordingly, the jitter buffer can minimize a sound quality deterioration caused by voice packets to be played back.

Figure 6:
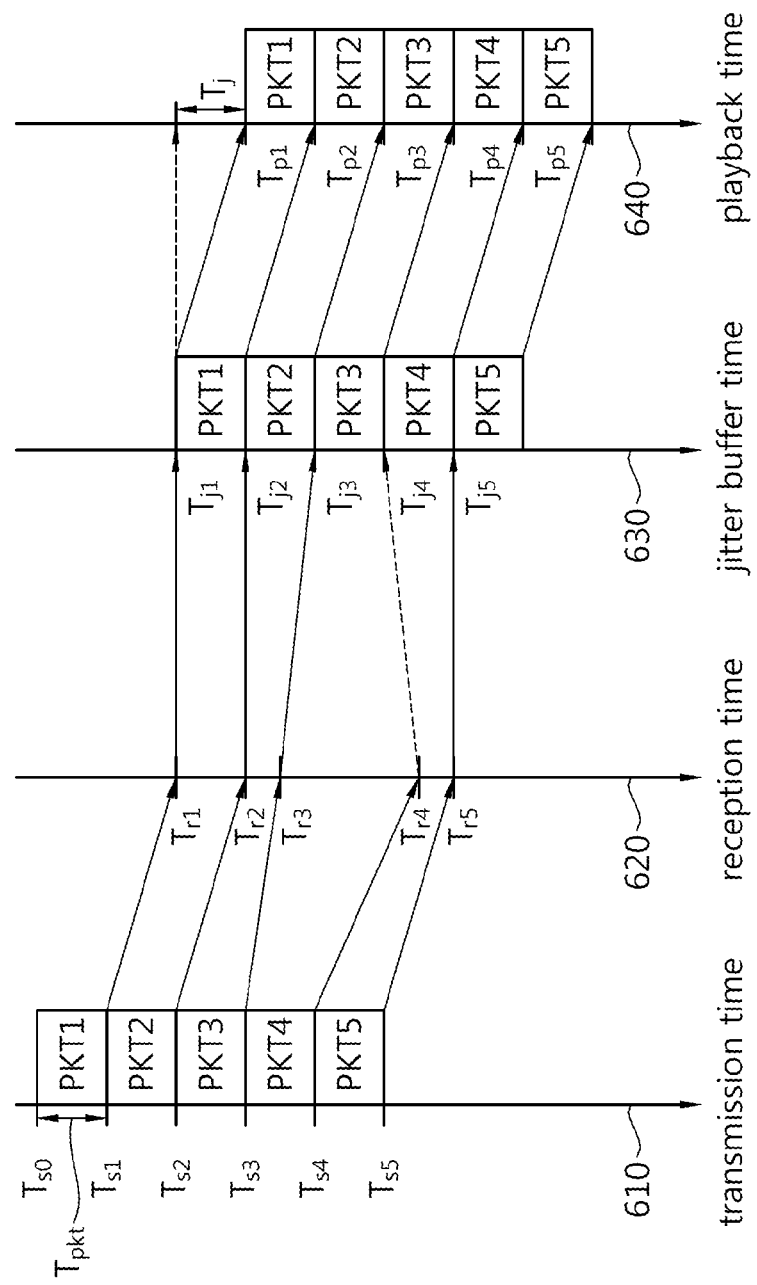
FIG. 6 is a schematic view showing an example of a jitter buffer management.

FIG. 6 is a schematic view showing an example of a jitter buffer management. A case where five voice packets are transmitted/received/managed/played back is exemplified in FIG. 6.

Referring to FIG. 6, a transmission time for transmitting the voice packets in a transmitting end is indicated on a time axis 610. For example, the voice packets PKT1 to PKT5 are transmitted at respective transmission times $T_{s1}$ to $T_{s5}$ with a time interval $T_{pkt}$. In this case, the time interval $T_{pkt}$ may be a playback time of each voice packet.

A reception time for receiving the voice packets in a receiving end is indicated on a time axis 620. For example, the voice packets PKT1 to PKT5 are received at respective reception times $T_{r1}$ to $T_{r5}$. As illustrated, the received voice packets may be influenced by various delay factors in a transmission process, and may not be received with a specific time interval.

The voice packets are delivered to the jitter buffer, unlike in the case of FIG. 5. A time at which the voice packets are input to the jitter buffer is indicated on a jitter buffer time axis 630. For example, the voice packets PKT1 to PKT5 are input to the jitter buffer at jitter buffer input times $T_{j1}$ to $T_{j5}$. The jitter buffer may store a corresponding voice packet during a specific time and thereafter may deliver the voice packet to a playback end according to a playback time for each voice packet.

The playback time at which the voice packets are played back in the playback end is indicated on a playback time axis 640. For example, the voice packets PKT1 to PKT5 are input at playback times $T_{p1}$ to $T_{p5}$ with an interval of a playback time $T_{pkt}$. In comparison with the case of FIG. 5, an $X^{th}$ voice packet is played back in the playback end after a buffer time $T_j$ elapses from the playback time $T_{pX}$ of FIG. 5.

Referring to FIG. 6, similarly to FIG. 5, a $4^{th}$ voice packet TPK4 is received at $T_{r4}$ which is later than a jitter buffer input prediction time $T_{j4}$, but is received within a buffer time $T_j$ so that the packet TPK4 can be played back smoothly at a playback time $T_{p4}$.

When the buffer time $T_j$ provided in the jitter buffer is great, a sound quality deterioration caused by a transmission delay may be decreased, but an additional delay may occur in the jitter buffer. Therefore, the sound quality deterioration and the delay have a trade-off relation in proportion to the value $T_j$.

The jitter buffer needs to be controlled/managed to optimize a relation between the sound quality deterioration and the delay and to improve playback performance. A voice packet (or voice frame) in the jitter buffer may be specified by a time stamp field and a sequence number field included in an RTP header, and may be processed on the basis thereof.

The time stamp field indicates a time at which a voice packet is played back. The sequence number field provides a number which is increased for each voice packet to the jitter buffer (or a device for controlling the jitter buffer), so that voice packets are arranged in the jitter buffer in an orderly manner.

Voice packets which are subjected to queuing are played back sequentially according to respective playback times. In this regard, the jitter buffer needs to be managed in two cases, for example, a case where the jitter buffer is full of voice packets and a case where the number of voice packets in the jitter buffer is less than the number of voice packets that can be accommodated by a minimum-sized buffer.

A case where the jitter buffer is full of voice packets and thus cannot accommodate the voice packets in the buffer any more may occur when a voice packet is arrived with a decreased long-time transmission delay or when there is an oscillation error in a recording unit of a transmitting side (e.g., if it is faster than a given sampling rate) or when there is an oscillation error in a playback unit of a receiving side (e.g., if it is slower than a given sampling rate). In this case, to solve this problem, the jitter buffer may drop a voice packet in the jitter buffer or compress an audio signal in a playback process.

A case where the number of voice packets in the jitter buffer is not enough and thus the voice packets cannot be smoothly played back may occur when a transmission delay of the voice packet is increased for a long period of time and/or the voice packet is lost or when there is an oscillation error in a recording unit of a transmitting side (e.g., if it is smaller than a given sampling rate) or when there is an oscillation error in a playback unit of a receiving side (e.g., if it is faster than a given sampling rate). In this case, the problem may be solved by generating a voice packet or by extending a length of an audio signal.

Figure 7:
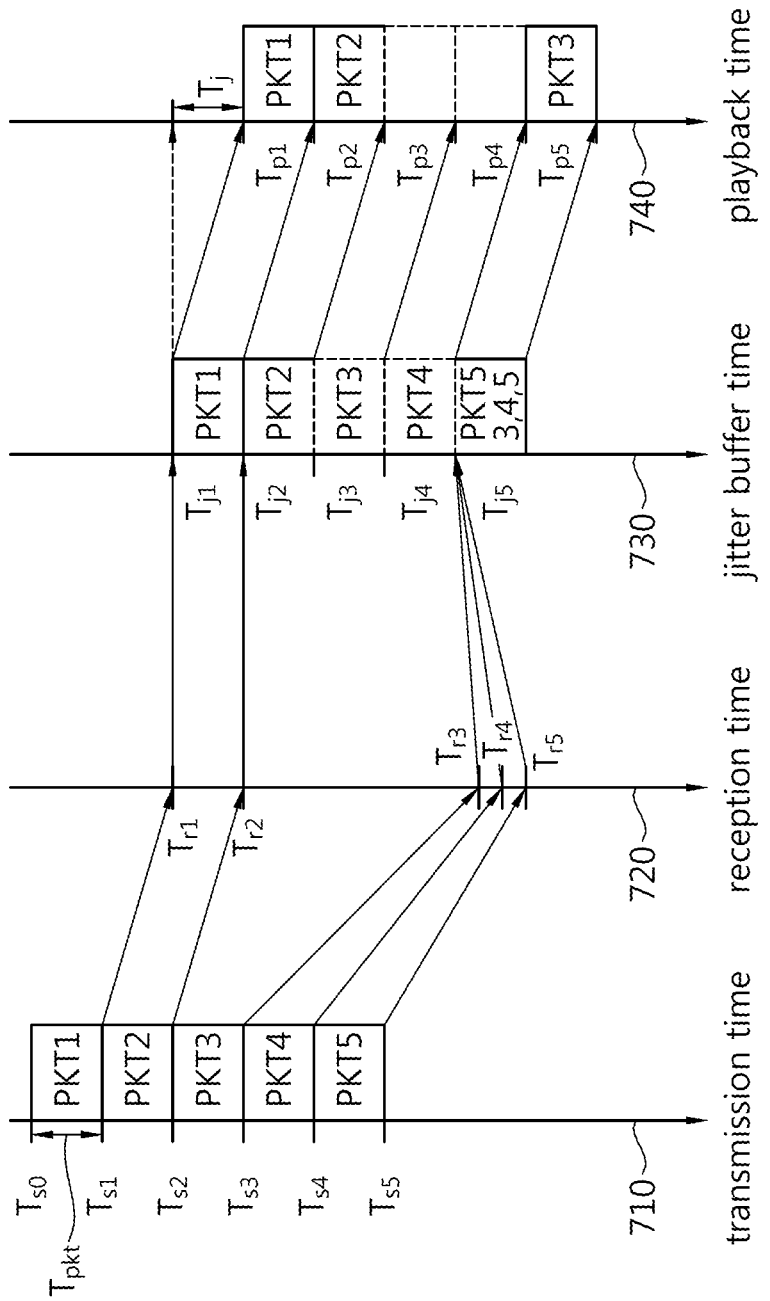
FIG. 7 is a schematic view showing an example of requiring a jitter buffer control.

FIG. 7 is a schematic view showing an example of requiring a jitter buffer control. Referring to FIG. 7, a transmission time at which voice packets are transmitted in a transmitting end is indicated on a transmission time axis 710, and a reception time at which voice packets are received in a receiving end is indicated on a reception time axis 720.

A time at which voice packets are input to a jitter buffer is indicated on a jitter buffer time axis 730. In addition, a playback time at which voice packets are played back in a playback end is indicated on a playback time axis 740.

In the example of FIG. 7, jitter buffer input times of packets PKT3, PKT4, and PKT5 are concentrated at $T_{j5}$ due to a transmission delay. Therefore, at playback times $T_{p3}$ and $T_{p4}$ of the packets PTK3 and PKT4, a voice packet to be played back does not exist in the jitter buffer.

Accordingly, when a management of the jitter buffer is considered according to a playback time, there is a problem in which voice packets are insufficient in the jitter buffer in the playback times $T_{p3}$ and $T_{p4}$ as described above, and there is a problem in which the jitter buffer is abruptly full due to the voice packets in the playback time $T_{p5}$ as described above.

In the jitter buffer or the playback end, a time stamp and a sequence number of an uppermost packet in the jitter buffer are confirmed to play back voice packets stored in the jitter buffer. For example, if the sequence number is increased by an expected increment, a corresponding voice packet may be played back. On the other hand, if it is not the sequence number which is increased sequentially by the expected increment (e.g., if the sequence number is not greater by 1 than a voice packet previously played back), it may be regarded that there is a packet loss, and thus a process for compensating for this may be performed.

If it is determined that there is a loss in a voice packet, it may be considered a method of generating alternative information (e.g., an alternative voice frame or an alternative voice packet) for compensating for the lost packet (or frame) and playing back the generated alternative information. If there is no voice packet stored in the jitter buffer, a method of compensating for the lost packet for a specific time period may be used according to a playback method using a white noise frame and a playback method of extending a signal length.

Meanwhile, as described above, if a size of the jitter buffer is too small, it is difficult for the jitter buffer to sufficiently handle a jitter of the voice packet. In addition, since the jitter buffer is easily full, it becomes difficult to input a new voice packet.

On the other hand, if the size of the jitter buffer is too great, the jitter buffer may cause an excessive playback delay.

Accordingly, in order to achieve an audio playback without a delay while not deteriorating signal quality of an audio signal, there is a need for a method of effectively adjusting the size of the jitter buffer or compensating for voice information.

In this case, instead of considering only an uppermost voice packet requested in the playback end, by considering a type of the voice packet, voice information may be compensated for, for example, on the basis of an importance regarding voice packets in the jitter buffer.

The audio signal may consist of a non-silent duration and a silent duration. Whether the voice packet corresponds to a non-silent voice or corresponds to a silent voice may be indicated by using a frame type (FT) indicator of an encoded voice packet. In addition, whether the voice packet corresponds to the non-silent voice or the silent voice may be indicated by using an additional classification block, e.g., voice activity detection (VAD), etc., after the voice packet is decoded.

In general, signal editing of the silent duration has a less effect on sound quality than signal editing of the non-silent duration. Accordingly, importance of a voice packet in the jitter buffer can be determined by using such a characteristic.

The jitter buffer can perform a jitter buffer control on the basis of the determined importance of the voice packet. By managing/controlling the jitter buffer on the basis of the importance of the voice packet, frequency of voice distortion caused by the jitter buffer control can be decreased and sound quality can be improved.

More specifically, an importance of a voice packet which becomes a target of the jitter buffer management/control may be determined by the following order. For example, an order of a voice packet which becomes a target of the jitter buffer management may be determined in such a manner that a voice packet which first becomes a target of the jitter buffer management is determined and then a voice packet which secondly becomes a target of the jitter buffer management is determined.

A voice packet which can become the target of the jitter buffer control with a first priority may be a voice packet located in the middle of a continuous silent duration. For example, in case of adaptive multi-rate wideband (AMR-WB), a packet in the middle of the continuous silent duration may be determined to a discontinuous transmission (DTX) packet.

A voice packet which can become the target of the jitter buffer control with a second priority may be a voice packet located in a mono-silent duration. For example, in case of AMR-WB, the packet in the mono-silent duration may be determined to an SID packet.

A voice packet which can become the target of the jitter buffer with a third priority is a voice packet located in a foremost position in the jitter buffer.

The importance of the voice packet may be an opposite order of targets to be processed. Therefore, a voice packet having a lowest importance is a voice packet located in the middle of the continuous silent duration, a voice packet having a second lowest importance is a voice packet located in the single silence duration, and a voice packet having a third lowest importance is a voice packet located in the foremost position in the buffer.

When controlling voice packets in the buffer, the jitter buffer may select a control target voice packet according to a priority of the packets, i.e., in order of: the voice packet located in the middle of the continuous silent duration→the voice packet located in the mono-silent duration→the voice packet located in the foremost position in the jitter buffer.

Figure 8:
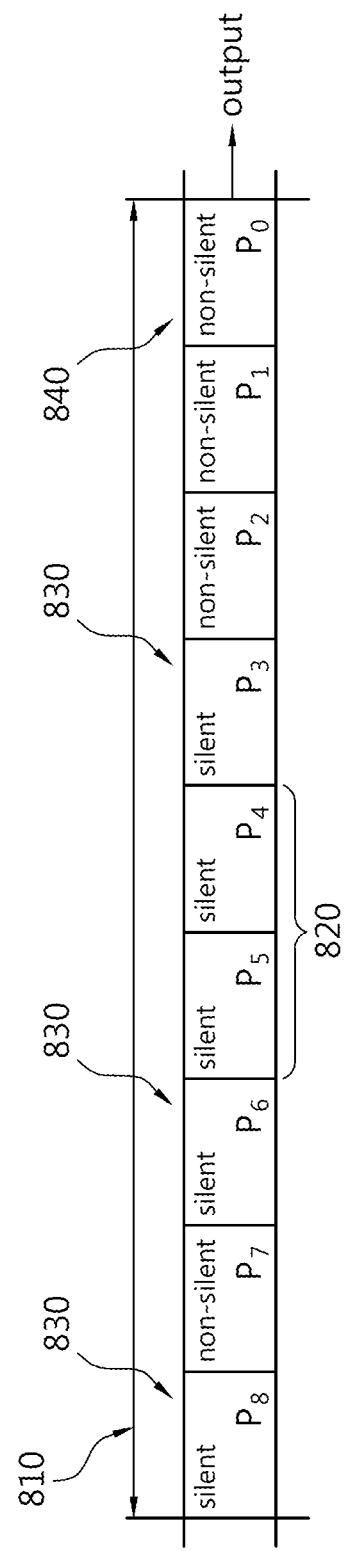
FIG. 8 is a schematic view showing an exemplary method of determining an importance of voice frames in a jitter buffer when voice information is compensated for in the jitter buffer.

FIG. 8 is a schematic view showing an exemplary method of determining an importance of voice frames in a jitter buffer when voice information is compensated for in the jitter buffer.

In the example of FIG. 8, a current size 810 of the jitter buffer is set in such a manner that up to 9 voice packets can be stored in a buffer. Referring to FIG. 8, voice packets $P_0$, $P_1$, $P_2$, and $P_7$ are non-silent signals, and voice packets $P_3$, $P_4$, $P_5$, $P_6$, and $P_8$ are silent signals.

When a target of a jitter buffer control is determined according to the aforementioned method of determining an importance of a voice packet, a control target with a first priority corresponds to voice packets $P_4$ and $P_5$ located in the middle of continuous silent durations $P_3$ to $P_6$. In the example of FIG. 8, a control target with a second priority corresponds to mono-silent packets 830, i.e., voice packets $P_3$, $P_6$, and $P_8$. In the example of FIG. 8, a control target with a third priority corresponds to a packet $P_0$ 840 located in a foremost position in the buffer.

In the present invention, as described above, a jitter buffer is managed on the basis of an importance of a voice packet. The jitter buffer may determine the importance of the voice packet in a buffer, and if voice information needs to be compensated for, a voice packet starting from a voice packet selected based on the importance may be handled as a target of a jitter buffer management.

Figure 9:
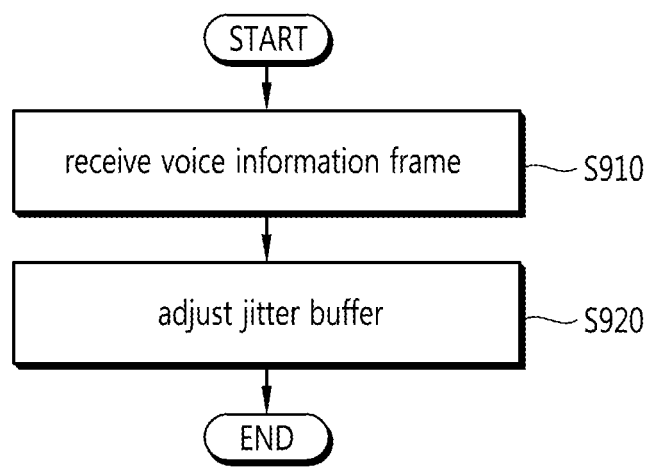
FIG. 9 is a flowchart showing an exemplary jitter buffer management method including a compensation for a voice frame.

FIG. 9 is a flowchart showing an exemplary jitter buffer management method including a compensation for a voice frame. The jitter buffer management may include an adjustment of a buffer size and a compensation for voice information in a buffer, and may be expressed as a jitter buffer control.

Referring to FIG. 9, the jitter buffer receives a voice packet (i.e., voice frame)(step S910). The voice packet may be transmitted from a decoder, or may be directly transmitted from an encoder by using a bit-stream.

The jitter buffer may perform a jitter buffer adjustment on the basis of the received voice packet (step S920).

The jitter buffer adjustment (or jitter buffer management) includes the adjustment of the buffer size and the compensation for the voice information in the buffer.

The buffer size adjustment may be performed in such a manner that the buffer size is decreased or increased between a maximum size and a minimum size of the buffer.

The compensation for the voice information includes voice information decimation and voice information generation. The voice information may be a voice packet or a voice frame. A decimation of the voice frame or the voice packet may also be regarded as a compensation for an audio signal. A generation of the voice frame or a generation of the voice packet may be regarded as an extension of the audio signal.

In general, when the compensation for the voice information is performed, the voice information may be decimated or generated in unit of a voice packet or in unit of a voice frame. In addition, the voice information is decimated/compressed or generated/extended at a bit-stream level or a level of an audio signal of which restoration is complete.

In this regard, if the compensation for the voice information is performed in unit of a voice packet or in unit of a voice frame, information which is lost or generated at a time is equal to or greater than a frame length, which may cause a sound quality deterioration due to a loss of continuous voice information. Therefore, it may be considered a method of performing the compensation for the voice information in unit of a subframe of the voice frame.

In addition, when the compensation is performed at the bit-stream level or at the level of the audio signal of which restoration is complete, a basic signal may be lost or a computation amount may be increased. Therefore, it may be considered a method of performing the compensation for the voice information at a decoding parameter level which can be regarded as an intermediary area between information of the bit-stream level and the restored audio signal.

In the present invention, a decoding parameter is information used before a bit-stream is decoded and then is composited/restored as an audio signal, and includes an LPC coefficient or an ISP coefficient for deriving the LPC coefficient, a pitch period, an excitation signal component, a codebook index for deriving the excitation signal component, etc.

Figure 10:
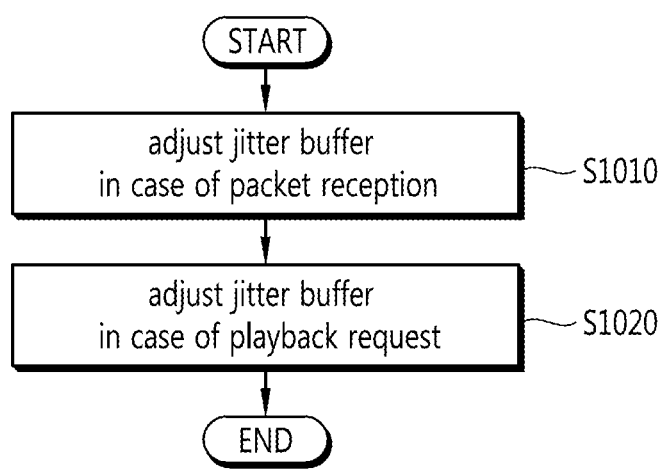
FIG. 10 is a flowchart showing an exemplary jitter buffer adjustment method.

FIG. 10 is a flowchart showing an exemplary jitter buffer adjustment method.

Referring to FIG. 10, a jitter buffer may perform a jitter buffer adjustment, upon receiving a voice packet (step S1010). This is called a jitter buffer adjustment or jitter buffer management in case of a voice information reception.

The jitter buffer may adjust a buffer size on the basis of a state of a current buffer, upon receiving the voice packet. For example, if the current buffer is full and thus a new voice packet cannot be accommodated, the jitter buffer may adjust a jitter buffer size to ensure a space for accommodating the new voice packet.

In addition, the jitter buffer may compensate for the voice information in a buffer.

The jitter buffer may perform the jitter buffer adjustment if there is a playback request (step S1020). This is called a jitter buffer adjustment or jitter buffer management in case of a playback request.

In case of the playback request, the jitter buffer may adjust a size of the buffer on the basis of a state of the current buffer. For example, if the current buffer is empty and thus there is no voice frame to be played back or if the number of voice frames in the current buffer is small and thus there is a concern that the playback is delayed, the jitter buffer may decrease a buffer time by adjusting the buffer size.

In addition, the jitter buffer may compensate for the voice information in the buffer.

If a jitter is generated by a network problem, an oscillation error, etc., as shown in FIG. 10, the jitter buffer may compensate for the voice information or may adjust the buffer size so that the playback is smoothly achieved.

As described above, the compensation for the voice information by the use of the jitter buffer management in the present invention may be performed at a decoding parameter level in unit of a subframe. A voice packet transmitted through a bit-stream may include at least one voice frame.

A voice frame and parameters in association therewith may be extracted from the voice packet by using parsing.

Therefore, a jitter buffer structure based on the present invention in regard to a location at which a voice packet is parsed to a voice frame having parameters or is decoded may be any one of 5 structures described below when referring to FIG. 3.

(i) A structure in which the jitter buffer management is performed on the basis of a decoding parameter in such a manner that a bit-stream is received directly from the receiver 310, the jitter buffer 300 or the buffer 320 of the jitter buffer 300 decodes a voice packet, and a voice frame having information of a decoding parameter level is stored in the buffer 320.

(ii) A structure in which the jitter buffer management is performed on the basis of a decoding parameter in such a manner that a voice frame having information of a decoding parameter level is received by the receiver 310 from the decoder and is stored in the buffer 320.

(iii) A structure in which a bit-stream (i.e., voice packet) is received directly by the receiver 310 and is stored in the buffer 320, and if necessary, the decoder or some modules of the decoder is invoked to acquire a voice frame having information of a decoding parameter level and to perform the jitter buffer management.

(iv) A structure in which a bit-stream (i.e., voice packet) is received directly by the receiver 310 and is stored in the buffer 320, and if necessary, the jitter buffer 300 or the buffer of the jitter buffer 300 acquires a voice frame having information of a decoding parameter level from a voice packet to perform the jitter buffer management.

(v) A structure in which the jitter buffer 300 is included in the decoder as some constitutional elements of the decoder, and a voice frame acquired from a voice packet is stored and managed in the buffer 320 and is output according to a decoding process.

Therefore, in the structures (i) and (iv), voice information may be delivered in an order of a jitter buffer→a decoder, and in the structure (ii), voice information may be delivered in an order of the decoder→the jitter buffer. In addition, in the structure (iii), the jitter buffer and the decoder need to perform parallel data processing, and the voice information may be transmitted and received if it is required between the jitter buffer and the decoder.

In the structures (i) and (ii), the jitter buffer may store the voice frame having information of the decoding parameter level, and the jitter buffer management may be performed in unit of a subframe. In the structures (iii) and (iv), the jitter buffer may store the voice packet, and if necessary, may acquire the voice frame having the information of the decoding parameter level and compensate for voice information in unit of a subframe.

In this regard, if the jitter buffer management is performed on the voice frame, a method of determining an importance of the voice packet may also be applied to the voice frame. In a case where the jitter buffer stores and manages the voice frame, a voice frame which can be a target of the jitter buffer management with a first priority is continuous silent voice frames, a voice frame which can be the target of the jitter buffer management with a second priority is a non-continuous silent voice frame, and a voice frame which can be the target of the jitter buffer management with a third priority is a voice frame located in a foremost position in the jitter buffer.

Voice information related to the jitter buffer may be transmitted to a playback device (i.e., an output device) via the decoder, and may be delivered to an output buffer of the playback device not via the decoder. For example, if the jitter buffer stores voice information which needs to be decoded in the buffer as information of a decoding parameter level, the information may be decoded in the decoder and thereafter may be output to the playback device.

Hereinafter, the jitter buffer management is described for separate cases, i.e., a jitter buffer adjustment in case of a packet reception and a jitter buffer adjustment in case of a playback request.

Jitter Buffer Adjustment in Case of Packet Reception

Figure 11:
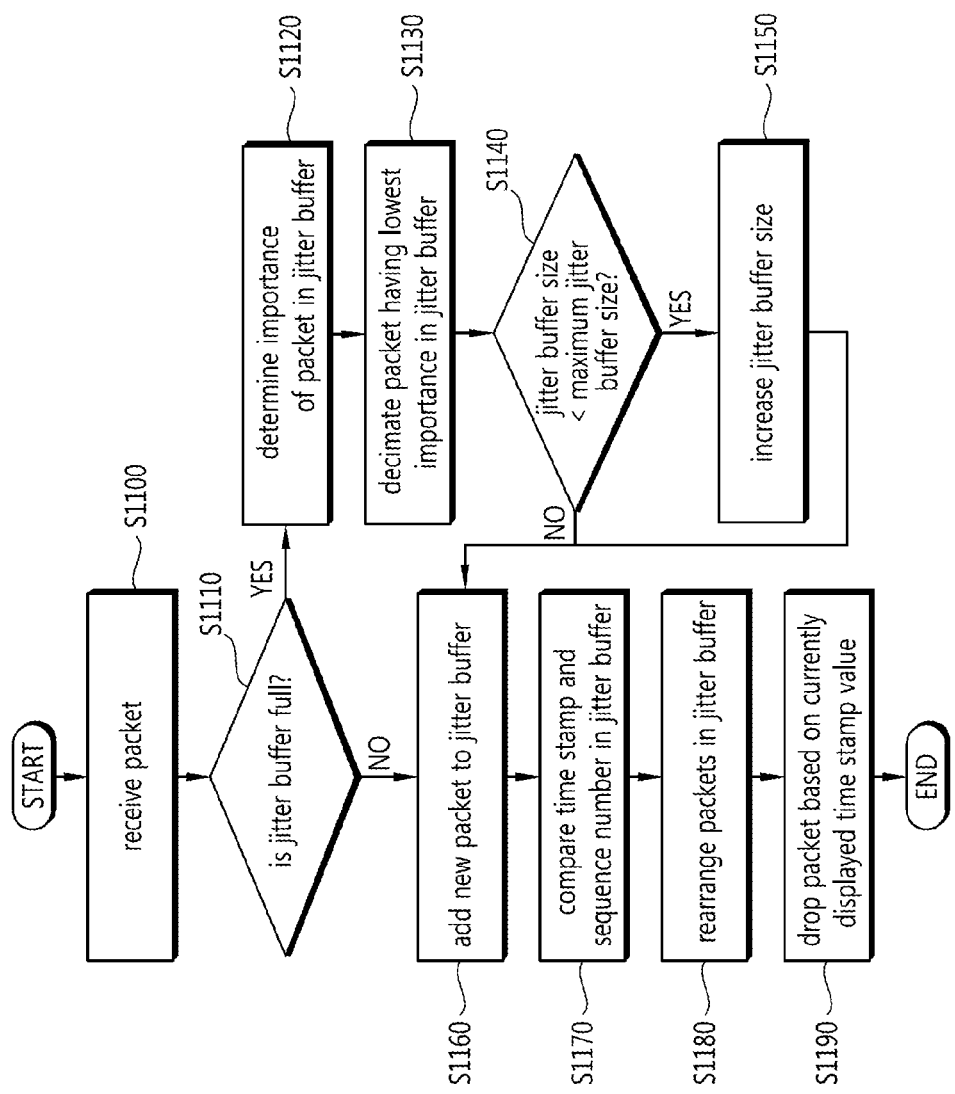
FIG. 11 is a flowchart showing an exemplary jitter buffer adjustment method in case of a packet reception.

FIG. 11 is a flowchart showing an exemplary jitter buffer adjustment method in case of a packet reception. In FIG. 11, a case where the jitter buffer stores a voice packet in a buffer and performs the jitter buffer management is described for the aforementioned structure (iii) or (iv). Therefore, in order to compensate for voice information of a decoding parameter level in unit of a subframe as described above, the jitter buffer may acquire necessary information from a decoder or the jitter buffer may extract the information from the voice packet.

Referring to FIG. 11, the jitter buffer receives a voice packet (step S1100).

The jitter buffer determines whether a current buffer is full of the voice packet (step S1110).

If the buffer is full of the voice packet, the jitter buffer may determine an importance for the voice packet in the buffer (step S1120). As described above, a voice packet located in the middle of a continuous silent duration has a lowest importance, a voice packet located in a mono-silent duration has a second lowest importance, and a voice packet located in a foremost position in the buffer has a lowest importance.

The jitter buffer processes the packet having the lowest importance among voice packets in the current buffer (step S1130). The jitter buffer may decimate the voice packet having the lowest importance. When the voice packet is decimated, decimation information indicating this (e.g., a flag Del_flag indicating that the packet is decimated) may be set. The decimation information may be referenced at the playback request and may report to the jitter buffer, the decoder, or the playback device, etc., that corresponding voice information does not exist.

If the processing of a voice packet having a low importance is a decimation of the packet, the jitter buffer may acquire a decoding parameter for a voice frame and a subframe to perform a compensation of decimating the voice information at the decoding parameter level in unit of a subframe belonging to the voice frame. The decoding parameter for the voice frame and the subframe may be acquired from the decoder as described above, or may be acquired autonomously by the jitter buffer by performing decoding.

After processing the voice packet having the low importance, the jitter buffer may compare a buffer size of a current jitter buffer and a maximum buffer size of the jitter buffer (step S1140).

If the current buffer size is less than the maximum buffer size, the jitter buffer may increase the current buffer size (step S1150). If there is a need to ensure a space in the buffer since the buffer is full of voice packets and there is a space for increasing the buffer size since the current buffer size is less than the maximum buffer size, the jitter buffer may increase the buffer size of the current jitter buffer.

More specifically, the buffer size of the jitter buffer may be determined in accordance with the number of voice packets that can be stored in the buffer. The jitter buffer size Tjit may have a value in the range of a minimum jitter buffer size Tjmin and a maximum jitter buffer size Tjmax.

The jitter buffer size Tjit may be adjusted in unit of Tpkt which is a playback time per voice packet. In this case, Tjmin and Tjmax may be set variably in unit of Tpkt by considering a network situation, etc.

For example, if an end-to-end delay during a call is set to be less than or equal to Td, the maximum jitter buffer size Tjmax satisfies a relation of Equation 1.

$$Tj\text{max} \leq Td - Tpkt - Tetc1 \quad \text{<Equation 1>}$$

In Equation 1, Tetc1 denotes a delay time caused by extra delay factors generated on a network. For example, the extra delay factor may include fixed delay factors such as a post-processing filter, a network relay problem, an oscillation error of a transmitting-end recording unit and a receiving-end playback unit, etc., and Td which is an end-to-end delay may be set to a typically used end-to-end delay, that is, 150 ms, etc.

A buffer size of the jitter buffer, i.e., Tjit, which is newly set to satisfy the relation of Equation 1 may be expressed by Equation 2.

$$Tjit=Tjit+Tpkt, Tjit \leq Tjmax \qquad \text{<Equation 2>}$$

In a case where the buffer of the jitter buffer is not full, the jitter buffer may add a received voice packet to the buffer (step S1160). The case where the buffer of the jitter buffer is not full may be any one of a case where the buffer of the jitter buffer is not full in step S1110, a case where a current buffer size of the jitter buffer is a maximum size in step S1140, and a case where a buffer size of the jitter buffer is increased in step S1150.

The jitter buffer may compare a sequence number and a time stamp number of voice packets in the buffer (step S1170). The time stamp number indicates a time at which the voice packet starts to be played back, and the sequence number is used to arrange voice packets in an orderly manner in the jitter buffer by providing the jitter buffer with a number which increases for each voice packet.

The jitter buffer may rearrange the voice packets in the buffer (step S1180). For example, the jitter buffer may rearrange the voice packets in the buffer in an orderly manner according to a sequence number of each packet.

The jitter buffer may drop the voice packets on the basis of a value of a current time stamp (step S1190). For example, the jitter buffer may confirm a time stamp of the voice packets in the buffer of the jitter buffer, and if there is a voice packet(s) having a previous time stamp (e.g., a time stamp having a value less than a time stamp corresponding to the current playback time) of a current playback time, may drop a corresponding voice packet.

Although a content of the jitter buffer adjustment that can be performed in case of a voice packet reception is fully described in FIG. 11, the jitter buffer may fully perform the aforementioned jitter buffer adjustment, or may selectively perform only a necessary operation regarding the jitter buffer adjustment.

In addition, although a case where the jitter buffer has the aforementioned structure (iii) or (iv) is exemplified in FIG. 11, the present invention is not limited thereto, and thus may also equally apply to a case where the jitter buffer has the structure (i) or (ii).

In a case where the jitter buffer has the structures (i) and (ii), the jitter buffer may perform the steps S1100 to S1190 not for a voice packet but for a voice frame. In this case, in step S1100, the jitter buffer receives or acquires not a voice packet but a voice frame having information of a decoding parameter level and stores and manages it in the buffer.

Jitter Buffer Adjustment in Case of Playback Request

Figure 12:
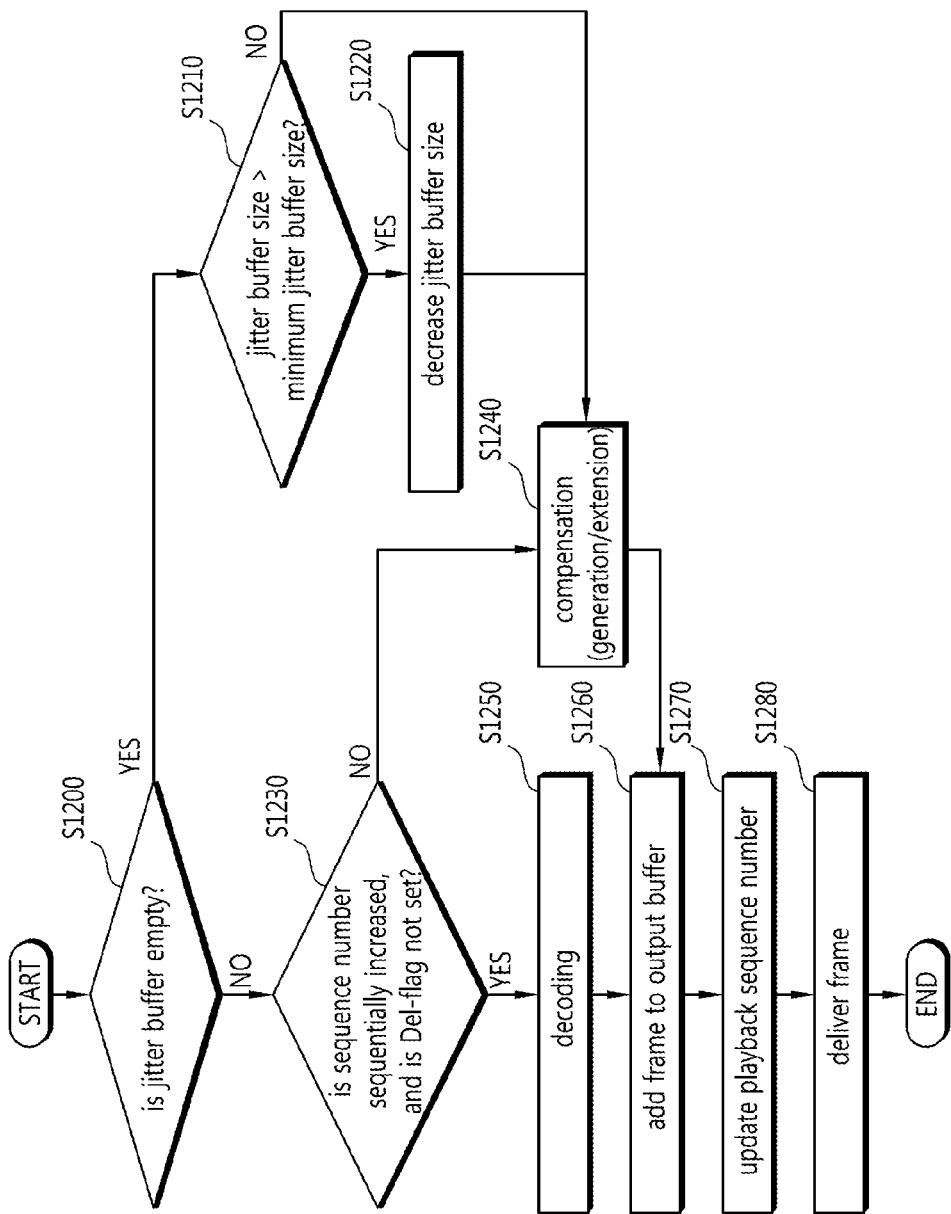
FIG. 12 is a flowchart showing an exemplary jitter buffer adjustment method in case of a playback request.

FIG. 12 is a flowchart showing an exemplary jitter buffer adjustment method in case of a playback request. For convenience of explanation, a case where a jitter buffer has the aforementioned structure (iii) or (iv) is taken as an example in the description of FIG. 12. Therefore, in order to compensate for voice information of a decoding parameter level in unit of a subframe as described above, the jitter buffer may acquire necessary information from a decoder or the jitter buffer may extract the information from the voice packet.

Referring to FIG. 12, if there is a playback request from a playback end (i.e., a playback device), the jitter buffer may determine whether a current buffer is empty (step S1200). For example, at the playback request, the jitter buffer may determine whether there is sufficient voice packets required for the playback in a buffer.

If it is determined that the buffer is empty, the jitter buffer may determine whether a size of the current buffer (i.e., a size of the jitter buffer) is greater than a minimum jitter buffer size (step S1210).

If the current buffer size of the jitter buffer is greater than a minimum jitter buffer size, the jitter buffer may decrease the buffer size of the jitter buffer (step S1220). If there is no voice packet in the buffer or if the number of voice packets is too small and thus a time for staying in the buffer needs to be decreased, the jitter buffer may decrease the buffer size of the current jitter buffer.

More specifically, the jitter buffer size Tjit may have a value in the range of a minimum jitter buffer size Tjmin and a maximum jitter buffer size Tjmax, and may be adjusted in unit of Tpkt which is a playback time per voice packet. In this case, Tjmin and Tjmax may be set variably in unit of Tpkt by considering a network situation, etc.

For example, since the maximum jitter buffer size Tjmin can be set to be greater than at least Tpkt which is a playback time per voice packet, the relation of Equation 3 is satisfied.

$$Tjmin \geq Tpkt+Tetc2 \qquad \text{<Equation 3>}$$

In Equation 3, Tetc2 denotes a delay time caused by other delay factors. The other delay factor includes a playback frequency error, etc., generated due to an error of an oscillation element in a playback end.

A buffer size of the jitter buffer, i.e., Tjit, which is newly set to satisfy the relation of Equation 3 may be expressed by Equation 4.

$$Tjit=Tjit-Tpkt, Tjit \geq Tjmin \qquad \text{<Equation 4>}$$

Meanwhile, if the jitter buffer is not empty at the playback request (i.e., if there is an enough voice packet required for the playback), the jitter buffer may determine whether a sequence number of voice packets in the buffer is increased sequentially according to an order by which the voice packets are arranged, or whether a decimation flag (i.e., Del-flag) is set (step S1230).

The jitter buffer may determine whether voice information needs to be compensated for, by determining whether the sequence number of the voice packets in the buffer is increased sequentially or whether the Del-flag is set.

For example, since the jitter buffer determines whether the sequence number of the voice packets in the buffer is increased sequentially, whether there is a need to generate a new voice packet may be determined by compensating for the voice information. In this case, if decimation information (i.e., del_flag) is set, the jitter buffer may determine that the voice packet in which the decimation information is set is decimated.

In a case where the sequence number is not increased sequentially or the decimation information (i.e., del_flag) is set, or in a case where a current buffer size of the jitter buffer is equal to a minimum jitter buffer size or the buffer size of the jitter buffer is decreased, when required, the jitter buffer may compensate for the voice information (step S1240).

The jitter buffer may generate the voice information on the basis of an importance of the voice packet. In this case, in order to generate the voice information at a decoding parameter level in unit of a subframe belonging to a voice frame, the jitter buffer may acquire a decoding parameter for a voice frame and a subframe. The decoding parameter for the voice frame and the subframe may be acquired from the decoder as described above, or may be acquired autonomously by the jitter buffer by performing decoding.

If the sequence number is increased sequentially and the decimation information (i.e., del_flag) is not set, the voice packet may be decoded without compensation for the voice information (step S1250). The voice packet may be decoded in the decoder. If the sequence number is increased sequentially and the del_flag is not set, the jitter buffer may transmit the voice packet to the decoder. The decoder may decode the received voice packet to generate a voice frame(s).

The voice frame may be added to an output buffer of an output device (i.e., a playback device)(step S1260).

The output device may update a playback sequence number so that voice frames are played back sequentially (step S1270).

The voice frame may be delivered sequentially to a user (step S1280). The voice frame is played back by being sequentially delivered from the output device to the user.

Although a content of the jitter buffer adjustment that can be performed in case of a voice packet reception is fully described in FIG. 11, the jitter buffer may fully perform the aforementioned jitter buffer adjustment, or may selectively perform only a necessary operation regarding the jitter buffer adjustment.

In addition, although a case where the jitter buffer has the aforementioned structure (iii) or (iv) is exemplified in FIG. 12, the present invention is not limited thereto, and thus may also equally apply to a case where the jitter buffer has the structure (i) or (ii).

In a case where the jitter buffer has the structures (i) and (ii), the jitter buffer may perform the steps S1200 to S1280 not for a voice packet but for a voice frame. In this case, since the jitter buffer stores and manages the voice frame in the buffer, the jitter buffer management may be performed by using a subframe belonging to the voice frame and a decoding parameter thereon. For example, in the decoding step, decoding for restoring an audio signal in unit of a voice frame may be performed by using the decoding parameter.

Hereinafter, a voice information compensation method applicable to a jitter buffer adjustment in case of a voice packet reception and a jitter buffer adjustment in case of a playback request is described in detail.

As described above, the compensation for the voice information includes voice information decimation and voice information generation. Referring to FIG. 11 and FIG. 12, the decimation of the voice information may be applied to the jitter buffer adjustment in case of a voice packet reception (e.g., step S1130), and the generation of the voice information may be applied to the jitter buffer adjustment in case of a playback request (e.g., step S1240).

As a method of managing the jitter buffer, the processing of the voice information may be performed at a bit-stream level in a conventional manner in addition to the decoding parameter level, and may also be performed at an audio signal level.

FIG. 13 is a schematic view showing an example of performing a jitter buffer management at a bit-stream level. In the example of FIG. 13, the jitter buffer management is performed in such a manner that a voice frame is decimated.

If a buffer is full, the jitter buffer may determine a frame to be decimated from a bit-stream, and may decimate the selected frame. Referring to FIG. 13, if an $n^{th}$ voice frame is decimated, the jitter buffer management is performed by decimating the $n^{th}$ frame from a bit-stream barrel.

In case of FIG. 13, since the jitter buffer processes information in unit of a voice frame, it may be located in an output end of a decoder and thus may receive voice information decoded by the decoder and store/manage the information.

Figure 14:
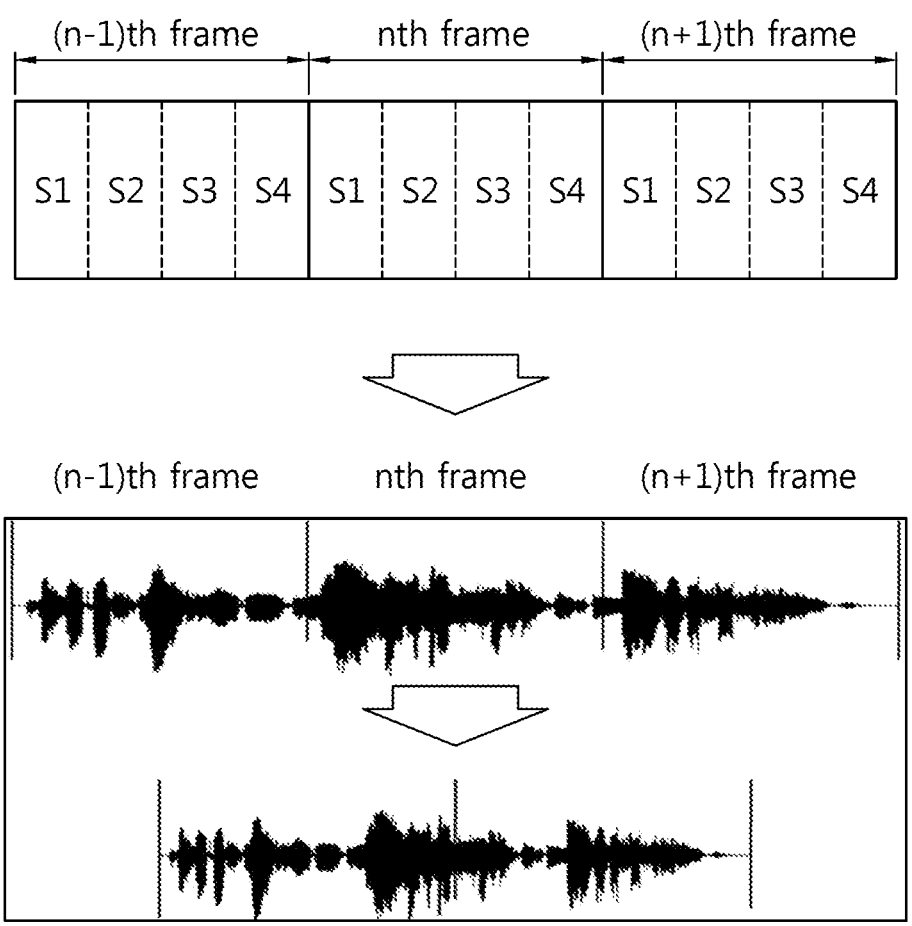
FIG. 14 is a schematic view showing an example of performing a jitter buffer management at an audio signal level.

FIG. 14 is a schematic view showing an example of performing a jitter buffer management at an audio signal level. In the example of FIG. 14, the jitter buffer management is performed by decreasing a length of an audio signal.

If a buffer is full, the jitter buffer may restore a bit-stream into an audio signal, and may decrease the length of the audio signal by applying a time scaling modification (TSM) technique. Referring to FIG. 14, after the jitter buffer management, a total length of an $(n-1)^{th}$ voice frame, an $n^{th}$ voice frame, and an $(n+1)^{th}$ voice frame is decreased by a voice frame length while maintaining an overall pattern of the audio signal.

In case of FIG. 14, since the jitter buffer processes an audio signal, it may be located in an output end of a decoder and thus may receive voice information decoded by the decoder and store/manage the information.

Meanwhile, when the jitter buffer management is performed by decimating voice information in unit of frame at a bit-stream level as shown in the example of FIG. 13, although the jitter buffer can be adjusted by using a simple arithmetic operation, sound quality significantly deteriorates since the voice information (or audio signal) corresponding to one voice frame is decimated at a time.

In addition, when the jitter buffer management is performed at an audio signal level as shown in the example of FIG. 14, although less audio information may be lost in comparison with a case of performing the jitter buffer management at a bit-stream level since there is an effect of increasing an audio playback speed, complexity of an encoder/decoder is increased.

Therefore, according to the present invention, the jitter buffer management is performed at a decoding parameter level in unit of a subframe of a voice frame as described above, thereby being able to avoid a sound quality deterioration and to decrease a complexity of processing.

When the jitter buffer is managed at a decoding parameter level in unit of a subframe belonging to a voice frame according to the present invention, the jitter buffer may output information to the decoder or may receive the information from the decoder as described above in the structures (i) to (v), unlike the examples of FIG. 13 and FIG. 14 in which the jitter buffer is located in an output end of the decoder.

FIG. 15 is a schematic view showing an example of compensating for voice information in unit of a subframe of a voice frame.

As described above, if an audio signal is decimated in unit of a voice frame in a process of performing a jitter buffer management, sound quality deterioration becomes significant since an audio signal lost at a time is the same as a length of a voice frame.

In the example of FIG. 15, the audio signal is decimated in unit of a subframe to decrease a component of a continuously lost audio signal.

Referring to FIG. 15, comparing with the cases of FIG. 13 and FIG. 14, an audio signal to be decimated is identical as one frame. However, in the example of FIG. 15, the audio signal may be decimated in such a manner that a subframe of a neighboring frame is replaced with a subframe of a voice frame to be decimated.

In the present invention, n−1, n, and n+1 for indicating frames or packets are indices for indicating continuous voice frames or continuous voice packets. An $n^{th}$ frame is any $n^{th}$ frame in a whole frame sequence as a decimation target frame, and an $(n-1)^{th}$ frame and an $(n+1)^{th}$ frame are neighboring frames located before and after a decimation target (or deleted) frame.

In the example of FIG. 15, a $1^{st}$ subframe S1 of the $n^{th}$ subframe replaces a $3^{rd}$ subframe S3 of an $(n-1)^{th}$ subframe, a $2^{nd}$ subframe S2 of the $n^{th}$ frame replaces a $4^{th}$ subframe S4 of an $(n-1)^{th}$ frame, a $3^{rd}$ subframe S3 of the $n^{th}$ subframe replaces a $1^{st}$ subframe S1 of the $(n+1)^{th}$ frame, and a $4^{th}$ subframe S4 of the $n^{th}$ frame replaces a $2^{nd}$ subframe S3 of the $(n+1)^{th}$ frame.

Accordingly, the $n^{th}$ voice frame is decimated, and a $3^{rd}$ subframe S3' and a $4^{th}$ subframe S4' of the $(n-1)^{th}$ voice frame and a $1^{st}$ subframe S1' and a $2^{nd}$ subframe S2' of the $(n+1)^{th}$ voice frame are newly generated.

When the audio signal is decimated in unit of a subframe, as illustrated, since some subframes are decimated from a neighboring voice frame of a target voice frame, an effect of an audio signal loss concentrated on one frame can be shared by neighboring frames. Therefore, a component of a continuously lost audio signal can be decreased, and at the same time, it is possible to avoid an occurrence of an additional computation (i.e., an increase in complexity) which may be accompanied in the jitter buffer management.

Although a case where a voice frame consists of four subframes is described as an example in FIG. 15, the present invention is not limited thereto. For example, if the voice frame consists of L subframes, last L/2 subframes of a previous frame (i.e., $(n-1)^{th}$ frame) of a decimation target frame (i.e., $n^{th}$ frame) may be replaced with first L/2 subframes of the decimation target frame (i.e., $n^{th}$ frame), and first L/2 subframes of a next frame (i.e., $(n+1)^{th}$ frame) of the decimation target frame (i.e., $n^{th}$ frame) may be replaced with last L/2 subframes of the decimation target frame (i.e., $n^{th}$ frame).

Meanwhile, when voice information is compensated for at a bit-stream level, even if the voice information is decimated in unit of a subframe, a component of a corresponding subframe disappears directly, which may result in a sound quality deterioration of a specific level. If the voice information is compensated for at an audio signal level to avoid this, a computation amount may increase significantly.

Accordingly, while compensating for the voice information in unit of the subframe, the voice information may be allowed to be compensated for at a decoding parameter level which can be regarded as an intermediary level of information of a bit-stream level and a restored audio signal. Herein, the decoding parameter implies information used before a bit-stream is decoded and then is composited to an audio signal.

Examples of the decoding parameter include an LPC coefficient or an ISP coefficient for deriving the LPC coefficient, a pitch period, an excitation signal component, a codebook index for deriving the excitation signal component, etc.

The jitter buffer may compensate for voice information by using a neighboring frame or decoding parameters of the neighboring frame, instead of simply decimating a target frame or a target subframe and its decoding parameters. In this case, decoding parameters of a decimation target subframe may be used to compensate for the voice information.

When the voice packet is received, the jitter buffer may determine the decimation target frame according to the aforementioned packet importance (i.e., frame importance), and may perform any one of the following three voice information compensation operations regarding a decimation of the voice information.

(1) The jitter buffer decimates the decimation target frame, while modifying a decoding parameter of a subframe belonging to a frame located before and after the decimation target frame by using the decoding parameter of the decimation target frame.

(2) The decimation target frame is decimated, while modifying a decoding parameter of a subframe belonging to a frame located before the decimation target frame by using a decoding parameter of the decimation target frame.

(3) The decimation target frame is decimated, while modifying a decoding parameter of a subframe belonging to a frame located after the decimation target frame by using a decoding parameter of the decimation target frame.

Figure 16:
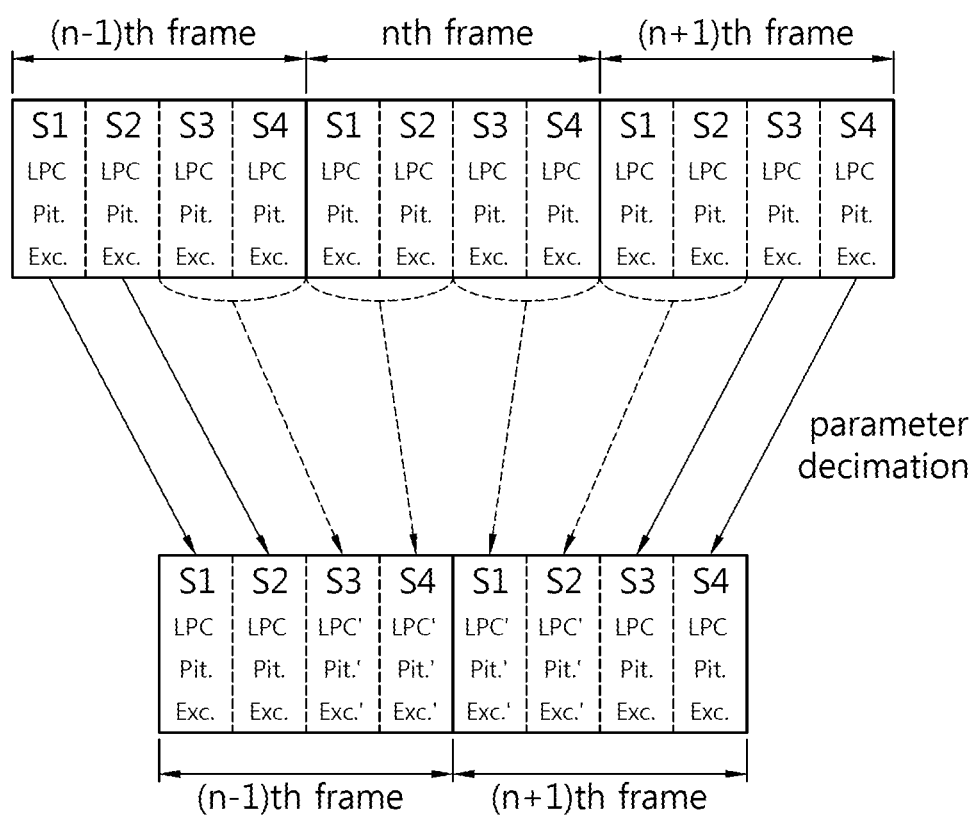
FIG. 16 to FIG. 22 are schematic views showing an exemplary method for compensating for voice information in unit of a subframe at a decoding parameter level.

FIG. 16 is a schematic view showing an exemplary method of compensating for voice information in unit of a subframe at a decoding parameter level.

In the example of FIG. 16, the voice information compensation method of the aforementioned operation (1) is described. Therefore, a decoding parameter for some subframes in a frame before/after a to-be-decimated frame (i.e., $n^{th}$ frame) is modified by using decoding parameters of two neighboring subframes.

Referring to FIG. 16, if an $n^{th}$ voice frame is decimated, a frame component (i.e., a decoding parameter) of an $(n-1)^{th}$ voice frame and an $(n+1)^{th}$ voice frame which are neighboring voice frames is modified.

By compensating for the voice information, the $n^{th}$ frame is decimated, a decoding parameter of a subframe S3' of the $(n-1)^{th}$ frame is modified by using decoding parameters of subframes S3 and S4 of the $(n-1)^{th}$ frame before the voice information compensation, a decoding parameter of a subframe S4' of the $(n-1)^{th}$ frame is modified by using decoding parameters of subframes S1 and S2 of the $n^{th}$ subframe before being decimated, a decoding parameter of a subframe S1' of the $(n+1)^{th}$ frame is modified by using decoding parameters of subframes S3 and S4 of the $n^{th}$ frame before being decimated, and a decoding parameter of a subframe S2' of the $(n+1)^{th}$ frame is modified by using decoding parameters of the subframes S1 and S2 of the $(n+1)^{th}$ frame before the voice information compensation.

In this case, the decoding parameter may be modified to a value generated by interpolating decoding parameters of two subframes.

Equation 5 shows a method of modifying an ISP coefficient among decoding parameters to a value generated by interpolating ISP coefficients of two subframes, by compensating for voice information (or by decimating voice information) according to the example of FIG. 16.

$$ISPn^-1_{m3} = 0.5 \times ISPn^-1_3 + 0.5 \times ISPn^-1_4$$

$$ISPn^-1_{m4} = 0.5 \times ISPn_1 + 0.5 \times ISPn_2$$

$$ISPn^+1_{m1} = 0.5 \times ISPn_3 + 0.5 \times ISPn_4$$

$$ISPn^+1_{m2} = 0.5 \times ISPn^+1_1 + 0.5 \times ISPn^+1_2 \quad <\text{Equation 5}>$$

In the present invention, $ISPN_L$ denotes an ISP coefficient of an $L^{th}$ subframe belonging to an $N^{th}$ frame, and $ISPN_{mL}$ denotes a modified ISP coefficient of the $L^{th}$ subframe belonging to the $N^{th}$ frame.

The ISP coefficient may be derived by converting from the LPC coefficient as described above, and the LPC coefficient may be derived by converting from the ISP coefficient.

Equation 6 shows a method of modifying a pitch period among decoding parameters to a value generated by interpolating pitch periods of two subframes, by compensating for voice information (or by decimating voice information) according to the example of FIG. 16.

$$Pn^-1_{m3} = 0.5 \times Pn^-1_3 + 0.5 \times Pn^-1_4$$

$$Pn^-1_{m4} = 0.5 \times Pn_1 + 0.5 \times Pn_2$$

$$Pn^+1_{m1} = 0.5 \times Pn_3 + 0.5 \times Pn_4$$

$$Pn^+1_{m2} = 0.5 \times Pn^+1_1 + 0.5 \times Pn^+1_2 \quad <\text{Equation 6}>$$

In the present invention, $PN_L$ denotes a pitch period of an $L^{th}$ subframe belonging to an $N^{th}$ frame, and $PN_{mL}$ denotes a modified pitch period of the $L^{th}$ subframe belonging to the $N^{th}$ frame.

The pitch period may be acquired by decoding long term prediction (LTP)-filtering, pitch delay (lag), codebook gain, etc.

Equation 7 shows a method of modifying an excitation signal component (i.e., FCB) among decoding parameters to a value generated by interpolating excitation signal components of two subframes, by compensating for voice information (or by decimating voice information) according to the example of FIG. 16.

$$FCBn^-1_{m3}(k)=0.5 \times FCBn^-1_3(k)+0.5 \times FCBn^-1_4(k)$$

$$FCBn^-1_{m4}(k)=0.5 \times FCBn_1(k)+0.5 \times FCBn_2(k)$$

$$FCBn^+1_{m1}(k)=0.5 \times FCBn_3(k)+0.5 \times FCBn_4(k)$$

$$FCBn^+1_{m2}(k)=0.5 \times FCBn^+1_1(k)+0.5 \times FCBn^+1_2(k) \quad \text{<Equation 7>}$$

In the present invention, $FCBN_L(K)$ denotes a $k^{th}$ component in an excitation signal of an $L^{th}$ subframe belonging to an $N^{th}$ frame, and $FCBN_{mL}(K)$ denotes a modified $k^{th}$ component of an excitation signal of the $L^{th}$ subframe belonging to the $N^{th}$ frame.

The excitation signal may be acquired by decoding a fixed codebook and a codebook gain.

Meanwhile, in case of the excitation signal, instead of being modified by using the interpolation, it is possible to apply a method in which a first-half component and a second-half component among excitation signal components of a subframe to be modified are respectively replaced with excitation signal components of subframes before modification.

Equation 8 shows a method of modifying an excitation signal component to a value generated by partially replacing excitation signal components of two subframes, by compensating for voice information (or by decimating voice information) according to the example of FIG. 16.

$$FCBn^-1_{m3}(k)=FCBn^-1_3(k)(k=0\sim\text{subframe}/2)$$

$$=FCBn^-1_4(k)(k=\text{subframe}/2\sim\text{subframe})$$

$$FCBn^-1_{m4}(k)=FCBn_1(k)(k=0\sim\text{subframe}/2)$$

$$=FCBn_2(k)(k=\text{subframe}/2\sim\text{subframe})$$

$$FCBn^+1_{m1}(k)=FCBn_3(k)(k=0\sim\text{subframe}/2)$$

$$=FCBn_4(k)(k=\text{subframe}/2\sim\text{subframe})$$

$$FCBn^+1_{m2}(k)=FCBn^+1_1(k)(k=0\sim\text{subframe}/2)$$

$$=FCBn^+1_2(k)(k=\text{subframe}/2\sim\text{subframe})$$

According to Equation 8, an $n^{th}$ frame is decimated by compensating for voice information, but a first-half thereof is replaced with a $k^{th}$ excitement signal component of a $3^{rd}$ subframe S3 belonging to an $(n-1)^{th}$ frame and a second-half thereof is replaced with a $k^{th}$ excitement signal component of a $4^{th}$ subframe S4 belonging to the $(n-1)^{th}$ frame, thereby generating a $3^{rd}$ subframe S3' of the $(n-1)^{th}$ frame having a modified decoding parameter.

In the same manner, as shown in Equation 8, a $4^{th}$ subframe S4' of the $(n-1)^{th}$ frame having a modified decoding parameter, a $1^{st}$ subframe S1' of an $(n+1)^{th}$ frame having a modified decoding parameter, and a $2^{nd}$ subframe S2' of the $(n+1)^{th}$ frame having the modified decoding parameter may be acquired.

In addition, among decoding parameters, in case of an excited signal component, a method in which an excitation signal component of a subframe to be modified is replaced in unit of a track for generating an excitation signal may be applied.

Equation 9 shows a method in which an excitation signal component is modified to a value generated by replacing in unit of the track for generating the excitation signal component, by compensating for voice information (or by decimating voice information) according to the example of FIG. 16.

$$FCBn^-1_{m3}(k)=FCBn^-1_3(k)(\text{track 1 \& 3})+FCBn^-1_4(k)(\text{track 2 \& 4})$$

$$FCBn^-1_{m4}(k)=FCBn_1(\text{track 1 \& 3})+FCBn_2(k)(\text{track 2 \& 4})$$

$$FCBn^+1_{m1}(k)=FCBn_3(k)(\text{track 1 \& 3})+FCBn_4(k)(\text{track 2 \& 4})$$

$$FCBn^+1_{m2}(k)=FCBn^+1_1(k)(\text{track 1 \& 3})+FCBn^+1_2(k)(\text{track 2 \& 4}) \quad \text{<Equation 9>}$$

An excitation signal component of a subframe to be modified consists of a partial sum of excitation signal components of two subframes before modification (i.e., compensation for voice information). In this case, the excitation signal component of the subframe to be modified chooses an excitation signal value at a corresponding track, for each track to which a wave number k belongs.

Although a case where a voice frame consists of four subframes is exemplified in FIG. 16, the present invention is not limited thereto. For example, if the voice frame consists of L subframes, last L/2 subframes of a previous frame (i.e., $(n-1)^{th}$ frame) of a decimation target frame (i.e., $n^{th}$ frame) and first L/2 subframes of a next frame (i.e., $(n+1)^{th}$ frame) of the decimation target frame (i.e., $n^{th}$ frame) are modified as described above by using subframes of the decimation target frame (i.e., $n^{th}$ frame) and last L/2 subframes of a previous frame (i.e., $(n-1)^{th}$ frame) of the decimation target frame (i.e., $n^{th}$ frame) and first L/2 subframes of a next frame (i.e., $(n+1)^{th}$ frame) of the decimation target frame (i.e., $n^{th}$ frame), and then the target frame (i.e., $n^{th}$ frame) may be decimated.

In this case, the interpolation described with reference to Equations 5 to 7 may also be performed by using p subframes (i.e., decoding parameters of the subframe)(where $2 \le p \le L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to 1/p.

Figure 17:
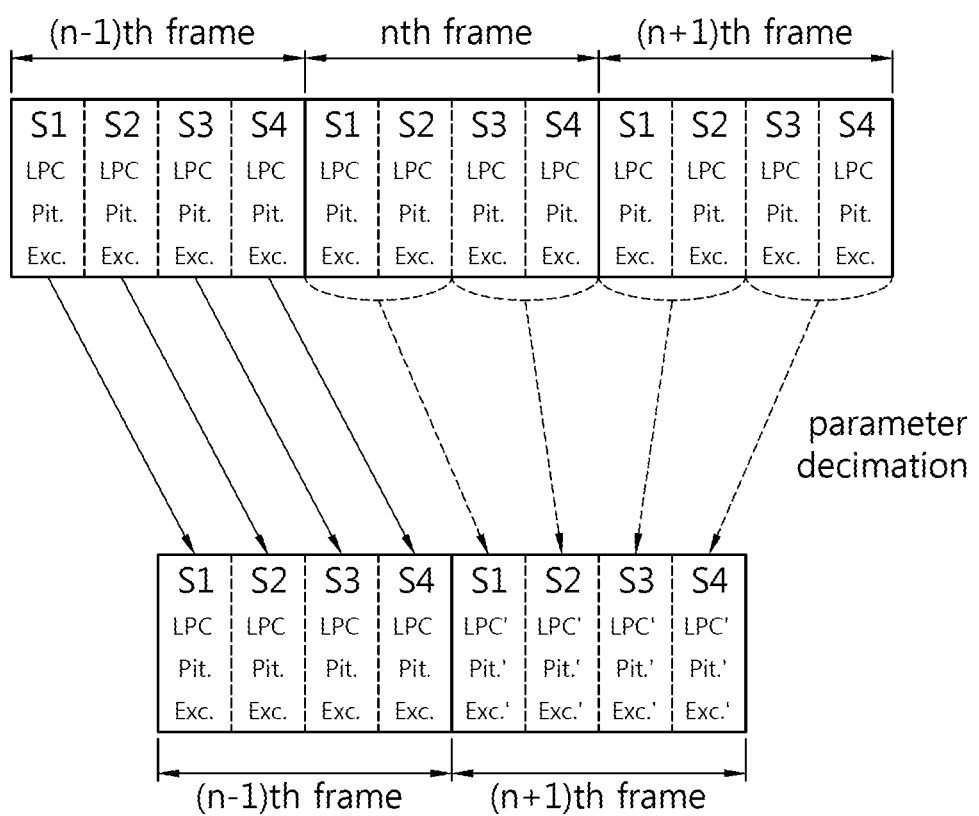

FIG. 17 is a schematic view showing another exemplary method of compensating for voice information in unit of a subframe at a decoding parameter level.

A case where the voice information compensation method of the operation (2) is exemplified in FIG. 17. Therefore, a decoding parameter for a subframe in a next frame of a to-be-decimated frame (i.e., $n^{th}$ frame) may be modified by using decoding parameters of two neighboring subframes among subframes belonging to the next frame of the to-be-decimated frame.

The decoding parameter may be modified to a value generated by interpolating decoding parameters of two subframes.

Equation 10 shows a method of interpolating and modifying an ISP coefficient among decoding parameters, by compensating for voice information (or by decimating voice information) according to the example of FIG. 17.

$$ISPn^+1_{m1} = 0.5 \times ISPn_1 + 0.5 \times ISPn_2$$

$$ISPn^+1_{m2} = 0.5 \times ISPn_3 + 0.5 \times ISPn_4$$

$$ISPn^+1_{m3} = 0.5 \times ISPn^+1_1 + 0.5 \times ISPn^+1_2$$

$$ISPn^+1_{m4} = 0.5 \times ISPn^+1_3 + 0.5 \times ISPn^+1_4 \quad \text{<Equation 10>}$$

Equation 10 is applied equally to Equation 5, and only difference is that a subframe to which a to-be-modified decoding parameter belongs and a subframe to which a to-be-used decoding parameter belongs are different from those of Equation 5.

Equation 11 shows a method of modifying a pitch period among decoding parameters through interpolation, by compensating for voice information (or by decimating voice information) according to the example of FIG. 17.

$$Pn^+1_{m1} = 0.5 \times Pn_1 + 0.5 \times Pn_2$$

$$Pn^+1_{m2} = 0.5 \times Pn_3 + 0.5 \times Pn_4$$

$$Pn^+1_{m3} = 0.5 \times Pn^+1_1 + 0.5 \times Pn^+1_2$$

$$Pn^+1_{m4} = 0.5 \times Pn^+1_3 + 0.5 \times Pn^+1_4 \quad \text{<Equation 11>}$$

Equation 11 is applied equally to Equation 6, and only difference is that a subframe to which a to-be-modified decoding parameter belongs and a subframe to which a to-be-used decoding parameter belongs are different from those of Equation 6.

Equation 12 shows a method of modifying an excitation signal component (i.e., FCB) among decoding parameters through interpolation, by compensating for voice information (or by decimating voice information) according to the example of FIG. 17.

$$FCBn^+1_{m1} = 0.5 \times FCBn_1 + 0.5 \times FCBn_2$$

$$FCBn^+1_{m2} = 0.5 \times FCBn_3 + 0.5 \times FCBn_4$$

$$FCBn^+1_{m3} = 0.5 \times FCBn^+1_1 + 0.5 \times FCBn^+1_2$$

$$FCBn^+1_{m4} = 0.5 \times FCBn^+1_3 + 0.5 \times FCBn^+1_4 \quad \text{<Equation 12>}$$

Equation 12 is applied equally to Equation 7, and only difference is that a subframe to which a to-be-modified decoding parameter belongs and a subframe to which a to-be-used decoding parameter belongs are different from those of Equation 7.

As shown in the example of FIG. 16, in case of an excitation signal, it is possible to apply a method in which a first-half component and a second-half component among excitation signal components of a subframe to be modified are respectively replaced with excitation signal components of subframes before modification.

Equation 13 shows a method of modifying an excitation signal component to a value generated by partially replacing excitation signal components of two subframes, by compensating for voice information (or by decimating voice information) according to the example of FIG. 17.

$$FCBn^+1_{m1}(k) = FCBn_1(k)(k=0 \sim \text{subframe}/2)$$

$$= FCBn_2(k)(k=\text{subframe}/2 \sim \text{subframe})$$

$$FCBn^+1_{m2}(k) = FCBn_3(k)(k=0 \sim \text{subframe}/2)$$

$$= FCBn_4(k)(k=\text{subframe}/2 \sim \text{subframe})$$

$$FCBn^+1_{m3}(k) = FCBn^+1_1(k)(k=0 \sim \text{subframe}/2)$$

$$= FCBn^+1_2(k)(k=\text{subframe}/2 \sim \text{subframe})$$

$$FCBn^+1_{m4}(k) = FCBn^+1_3(k)(k=0 \sim \text{subframe}/2)$$

$$= FCBn^+1_4(k)(k=\text{subframe}/2 \sim \text{subframe}) \quad \text{<Equation 13>}$$

Equation 13 is applied equally to Equation 8, and only difference is that a subframe to which a to-be-modified decoding parameter belongs and a subframe to which a to-be-used decoding parameter belongs are different from those of Equation 8.

In addition, among decoding parameters, in case of an excited signal component, a method in which an excitation signal component of a subframe to be modified is replaced in unit of a track for generating an excitation signal may be applied.

Equation 14 shows a method in which an excitation signal component is modified to a value generated by replacing in unit of the track for generating the excitation signal component, by compensating for voice information (or by decimating voice information) according to the example of FIG. 17.

$$FCBn^+1_{m1}(k) = FCBn_1(k)(\text{track 1 \& 3}) + FCBn_2(k)(\text{track 2 \& 4})$$

$$FCBn^+1_{m2}(k) = FCBn_3(k)(\text{track 1 \& 3}) + FCBn_4(k)(\text{track 2 \& 4})$$

$$FCBn^+1_{m3}(k) = FCBn^+1_1(k)(\text{track 1 \& 3}) + FCBn^+1_2(k)(\text{track 2 \& 4})$$

$$FCBn^+1_{m4}(k) = FCBn^+1_3(k)(\text{track 1 \& 3}) + FCBn^+1_4(k)(\text{track 2 \& 4}) \quad \text{<Equation 14>}$$

Equation 14 is applied equally to Equation 9, and only difference is that a subframe to which a to-be-modified decoding parameter belongs and a subframe to which a to-be-used decoding parameter belongs are different from those of Equation 9.

Although a case where a voice frame consists of four subframes is described as an example in FIG. 17, the present invention is not limited thereto. For example, if the voice frame consists of L subframes, subframes of a next frame (i.e., $(n+1)^{th}$ frame) of a decimation target frame (i.e., $n^{th}$ frame) is modified as described above by using subframes of the decimation target frame (i.e., $n^{th}$ frame) and subframes of the next frame (i.e., $(n+1)^{th}$ frame) of the decimation target frame (i.e., $n^{th}$ frame), and then the target frame (i.e., $n^{th}$ frame) may be decimated.

In this case, the interpolation described with reference to Equations 10 to 12 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to $1/p$.

Figure 18:
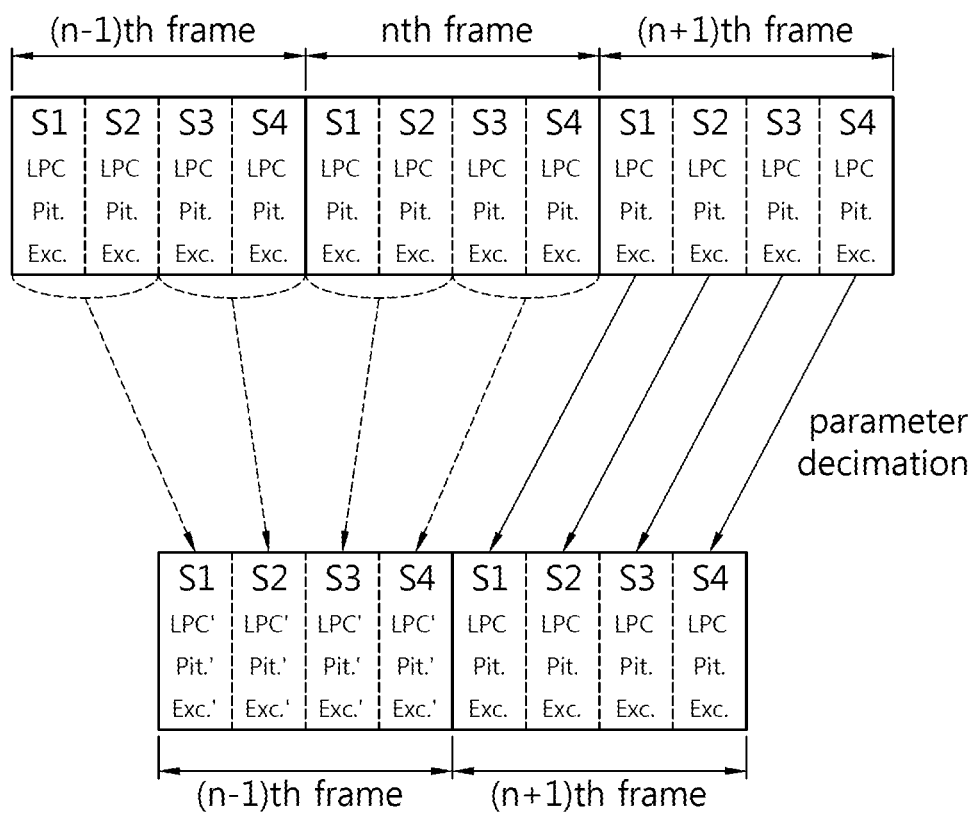

FIG. 18 is a schematic view showing another exemplary method of compensating for voice information in unit of a subframe at a decoding parameter level.

A case where the jitter buffer adjustment method of the operation (3) is exemplified in FIG. 18. Therefore, a decoding parameter for a subframe belonging to a previous frame of a to-be-decimated frame (i.e., $n^{th}$ frame) may be modified by using decoding parameters of two neighboring subframes among subframes belonging to the to-be-decimated frame and the previous frame.

The decoding parameter may be modified to a value generated by interpolating decoding parameters of two subframes.

Equation 15 shows a method of interpolating and modifying an ISP coefficient among decoding parameters, by compensating for voice information (or by decimating voice information) according to the example of FIG. 18.

$$ISPn^{-1}_{m1} = 0.5 \times ISPn^{-1}_1 + 0.5 \times ISPn^{-1}_2$$

$$ISPn^{-1}_{m2} = 0.5 \times ISPn^{-1}_3 + 0.5 \times ISPn^{-1}_4$$

$$ISPn^{-1}_{m3} = 0.5 \times ISPn_1 + 0.5 \times ISPn_2$$

$$ISPn^{-1}_{m4} = 0.5 \times ISPn_3 + 0.5 \times ISPn_4 \qquad \text{<Equation 15>}$$

Equation 15 is applied equally to Equation 5, and only difference is that a subframe to which a to-be-modified decoding parameter belongs and a subframe to which a to-be-used decoding parameter belongs are different from those of Equation 5.

Equation 16 shows a method of modifying a pitch period among decoding parameters through interpolation, by compensating for voice information (or by decimating voice information) according to the example of FIG. 18.

$$Pn^{-1}_{m1} = 0.5 \times Pn^{-1}_1 + 0.5 \times Pn^{-1}_2$$

$$Pn^{-1}_{m2} = 0.5 \times Pn^{-1}_3 + 0.5 \times Pn^{-1}_4$$

$$Pn^{-1}_{m3} = 0.5 \times Pn_1 + 0.5 \times Pn_2$$

$$Pn^{-1}_{m4} = 0.5 \times Pn_3 + 0.5 \times Pn_4 \qquad \text{<Equation 16>}$$

Equation 16 is applied equally to Equation 6, and only difference is that a subframe to which a to-be-modified decoding parameter belongs and a subframe to which a to-be-used decoding parameter belongs are different from those of Equation 6.

Equation 17 shows a method of modifying an excitation signal component (i.e., FCB) among decoding parameters through interpolation, by compensating for voice information (or by decimating voice information) according to the example of FIG. 17.

$$FCBn^{-1}_{m1} = 0.5 \times FCBn^{-1}_1 + 0.5 \times FCBn^{-1}_2$$

$$FCBn^{-1}_{m2} = 0.5 \times FCBn^{-1}_3 + 0.5 \times FCBn^{-1}_4$$

$$FCBn^{-1}_{m3} = 0.5 \times FCBn_1 + 0.5 \times FCBn_2$$

$$FCBn^{-1}_{m4} = 0.5 \times FCBn_3 + 0.5 \times FCBn_4 \qquad \text{<Equation 17>}$$

Equation 17 is applied equally to Equation 7, and only difference is that a subframe to which a to-be-modified decoding parameter belongs and a subframe to which a to-be-used decoding parameter belongs are different from those of Equation 7.

As shown in the example of FIG. 16, in case of an excitation signal, it is possible to apply a method in which a first-half component and a second-half component among excitation signal components of a subframe to be modified are respectively replaced with excitation signal components of subframes before modification.

Equation 18 shows a method of modifying an excitation signal component to a value generated by partially replacing excitation signal components of two subframes, by compensating for voice information (or by decimating voice information) according to the example of FIG. 18.

$$FCBn^{-1}_{m1}(k) = FCBn^{-1}_1(k)(k = 0 \sim \text{subframe}/2)$$

$$= FCBn^{-1}_2(k)(k = \text{subframe}/2 \sim \text{subframe})$$

$$FCBn^{-1}_{m2}(k) = FCBn^{-1}_3(k)(k = 0 \sim \text{subframe}/2)$$

$$= FCBn^{-1}_4(k)(k = \text{subframe}/2 \text{ subframe})$$

$$FCBn^{-1}_{m3}(k) = FCBn_1(k)(k = 0 \sim \text{subframe}/2)$$

$$= FCBn_2(k)(k = \text{subframe}/2 \sim \text{subframe})$$

$$FCBn^{-1}_{m4}(k) = FCBn_3(k)(k = 0 \sim \text{subframe}/2)$$

$$= FCBn_4(k)(k = \text{subframe}/2 \sim \text{subframe}) \qquad \text{<Equation 18>}$$

Equation 18 is applied equally to Equation 8, and only difference is that a subframe to which a to-be-modified decoding parameter belongs and a subframe to which a to-be-used decoding parameter belongs are different from those of Equation 8.

In addition, among decoding parameters, in case of an excited signal component, a method in which an excitation signal component of a subframe to be modified is replaced in unit of a track for generating an excitation signal may be applied.

Equation 19 shows a method in which an excitation signal component is modified to a value generated by replacing in unit of the track for generating the excitation signal component, by compensating for voice information (or by decimating voice information) according to the example of FIG. 18.

$$FCBn^{-1}_{m1}(k) = FCBn^{-1}_1(k)(\text{track } 1 \ \& \ 3) + FCBn^{-1}_2(k)(\text{track } 2 \ \& \ 4)$$

$$FCBn^{-1}_{m2}(k) = FCBn^{-1}_3(k)(\text{track } 1 \ \& \ 3) + FCBn^{-1}_4(k)(\text{track } 2 \ \& \ 4)$$

$$FCBn_{m3}(k) = FCBn_1(k)(\text{track } 1 \ \& \ 3) + FCBn_2(k)(\text{track } 2 \ \& \ 4)$$

$$FCBn_{m4}(k) = FCBn_3(k)(\text{track } 1 \ \& \ 3) + FCBn_4(k)(\text{track } 2 \ \& \ 4) \qquad \text{<Equation 19>}$$

Equation 19 is applied equally to Equation 9, and only difference is that a subframe to which a to-be-modified decoding parameter belongs and a subframe to which a to-be-used decoding parameter belongs are different from those of Equation 9.

Although a case where a voice frame consists of four subframes is described as an example in FIG. 18, the present invention is not limited thereto. For example, if the voice frame consists of L subframes, subframes of a previous frame (i.e., $(n-1)^{th}$ frame) of a decimation target frame (i.e., $n^{th}$ frame) are modified as described above by using subframes of the decimation target frame (i.e., $n^{th}$ frame) and subframes of a next frame (i.e., $(n+1)^{th}$ frame) of the decimation target frame (i.e., $n^{th}$ frame), and then the target frame (i.e., $n^{th}$ frame) may be decimated.

In this case, the interpolation described with reference to Equations 15 to 17 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to $1/p$.

Meanwhile, when the playback request is received, the jitter buffer may perform any one of the following four voice information compensation operations regarding a voice information generation.

(A) Subframes are generated in unit of a frame to extend an audio signal, while generating decoding parameters of new subframes by using decoding parameters of subframes belonging to a last frame among two neighboring frames and decoding parameters of some subframes belonging to a first frame thereof.

(B) Subframes are generated in unit of a frame to extend an audio signal, while generating decoding parameters of new subframes by using decoding parameters of subframes belonging to a first frame among two neighboring frames and decoding parameters of some subframes belonging to a last frame thereof.

(C) Subframes are generated in unit of a frame to extend an audio signal, while generating decoding parameters of new subframes by using decoding parameters of some subframes belonging to a first frame among two neighboring frames and decoding parameters of some subframes belonging to a last frame thereof.

(D) Subframes are generated in unit of a frame to extend an audio signal, while generating decoding parameters of new subframes by using decoding parameters of subframes belonging to a first frame among two neighboring frames and decoding parameters of subframes belonging to a last frame thereof.

In the voice information compensation of the above operations (A) to (D), a new subframe is generated between two neighboring subframes before a jitter buffer adjustment. A decoding parameter of the new subframe may be generated by using decoding parameters of the two neighboring subframes.

Figure 19:
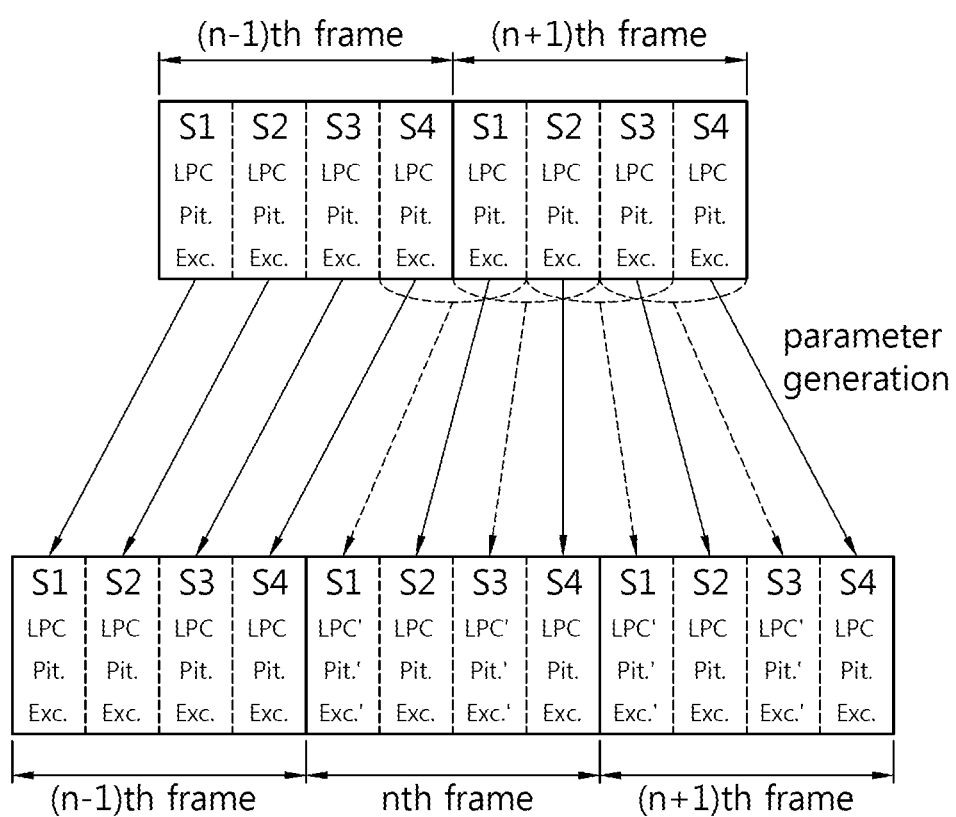

FIG. 19 is a schematic view showing another exemplary method of compensating for voice information in unit of a subframe at a decoding parameter level.

A case of applying the voice information compensation of the operation (A) is exemplified in FIG. 19. Therefore, by using decoding parameters of some subframes belonging to a previous frame (i.e., $(n-1)^{th}$ frame) of a to-be-generated frame (i.e., $n^{th}$ frame) and decoding parameters of subframes belonging to a next frame (i.e., $(n+1)^{th}$ frame), decoding parameters of subframes to be generated may be derived.

More specifically, a new subframe is generated between a last subframe S4 of the previous frame and a $1^{st}$ subframe S1 of the next frame, a new subframe is generated between the $1^{st}$ subframe S1 of the next subframe S1 and a $2^{nd}$ subframe of the next frame, a new subframe is generated between the $2^{nd}$ subframe of the next subframe and a $3^{rd}$ subframe S3 of the next frame, and a new subframe is generated between the $3^{rd}$ subframe S3 of the next frame and a last subframe S4 of the next frame. A decoding parameter of a subframe to be generated is derived from a decoding parameter of a subframe used in the generation.

The jitter buffer may configure a new frame by aggregating the generated subframes in unit of a frame. For example, if new subframes are generated between old subframes, a frame consisting of the old subframes and new subframes may be configured.

Equation 20 shows a method of interpolating and generating an ISP coefficient among decoding parameters, by compensating for voice information (or by generating voice information) according to the example of FIG. 19.

$$ISPn_{m1} = 0.5 \times ISPn^-1_4 + 0.5 \times ISPn^+1_1$$

$$ISPn_{m3} = 0.5 \times ISPn^+1_1 + 0.5 \times ISPn^+1_2$$

$$ISPn^+1_{m1} = 0.5 \times ISPn^+1_2 + 0.5 \times ISPn^+1_3$$

$$ISPn^+1_{m3} = 0.5 \times ISPn^+1_3 + 0.5 \times ISPn^+1_4 \quad \text{<Equation 20>}$$

The ISP coefficient may be derived by converting from the LPC coefficient as described above, and the LPC coefficient may be derived by converting from the ISP coefficient.

Equation 21 shows a method of interpolating and generating a pitch period among decoding parameters, by compensating for voice information (or by generating voice information) according to the example of FIG. 19.

$$Pn_{m1} = 0.5 \times Pn^-1_4 + 0.5 \times Pn^+1_1$$

$$Pn_{m3} = 0.5 \times Pn^+1_1 + 0.5 \times Pn^+1_2$$

$$Pn^+1_{m1} = 0.5 \times Pn^+1_2 + 0.5 \times Pn^+1_3$$

$$Pn^+1_{m3} = 0.5 \times Pn^+1_3 + 0.5 \times Pn^+1_4 \quad \text{<Equation 21>}$$

The pitch period may be acquired by decoding long term prediction (LTP)-filtering, pitch delay (lag), codebook gain, etc.

Equation 22 shows a method of interpolating and generating an excitation signal component among decoding parameters, by compensating for voice information (or by generating voice information) according to the example of FIG. 19.

$$FCBn_{m1} = 0.5 \times FCBn^-1_4 + 0.5 \times FCBn^+1_1$$

$$FCBn_{m3} = 0.5 \times FCBn^+1_1 + 0.5 \times FCBn^+1_2$$

$$FCBn^+1_{m1} = 0.5 \times FCBn^+1_2 + 0.5 \times FCBn^+1_3$$

$$FCBn^+1_{m3} = 0.5 \times FCBn^+1_3 + 0.5 \times FCBn^+1_4 \quad \text{<Equation 22>}$$

The excitation signal may be acquired by decoding a fixed codebook and a codebook gain.

Meanwhile, in case of the excitation signal, instead of being generated by using the interpolation, it is possible to apply a method of using an excitation signal component of subframes used in the generation as a first-half component and a second-half component of the excitation signal component for a subframe to be generated.

Equation 23 shows a method of using an excitation signal component of subframes used in the generation as a first-half component and a second-half component of the excitation signal component for a subframe to be generated, by compensating for voice information (or by generating voice information) according to the example of FIG. 19.

$$FCBn_{m1}(k) = FCBn^-1_4(k)(k=0 \sim \text{subframe}/2)$$

$$= FCBn^+1_1(k)(k=\text{subframe}/2 \sim \text{subframe})$$

$$FCBn_{m3}(k) = FCBn^+1_1(k)(k=0 \sim \text{subframe}/2)$$

$$= FCBn^+1_2(k)(k=\text{subframe}/2 \sim \text{subframe})$$

$$FCBn^+1_{m1}(k) = FCBn^+1_2(k)(k=0 \sim \text{subframe}/2)$$

$$= FCBn^+1_3(k)(k=\text{subframe}/2 \sim \text{subframe})$$

$$FCBn^+1_{m3}(k) = FCBn^+1_3(k)(k=0 \sim \text{subframe}/2)$$

$$= FCBn^+1_4(k)(k=\text{subframe}/2 \sim \text{subframe}) \quad \text{<Equation 23>}$$

In addition, in case of an excitation signal component among decoding parameters, the excitation signal component may be generated by applying a method of using excitation signal components of a subframe used in the generation in unit of a track.

Equation 24 shows a method of generating an excitation signal component by using an excitation signal component of an existing subframe in unit of a track, by compensating for voice information (or by generating voice information) according to the example of FIG. 19.

$$FCBn_{m1}(k)=FCBn^-1_4(k)(\text{track 1 \& 3})+FCBn^+1_1(k)\\(\text{track 2 \& 4})$$

$$FCBn_{m3}(k)=FCBn^+1_1(k)(\text{track 1 \& 3})+FCBn^+1_2(k)\\(\text{track 2 \& 4})$$

$$FCBn^+1_{m1}(k)=FCBn^+1_2(k)(\text{track 1 \& 3})+FCBn^+1_3(k)\\(\text{track 2 \& 4})$$

$$FCBn^+1_{m3}(k)=FCBn^+1_3(k)(\text{track 1 \& 3})+FCBn^+1_4(k)\\(\text{track 2 \& 4}) \quad <\text{Equation 24}>$$

An excitation signal component of a subframe to be generated consists of a partial sum of excitation signal components of existing two subframes. In this case, the excitation signal component of the subframe to be generated chooses an excitation signal value at a corresponding track, for each track to which a wave number k belongs.

Although a case where a voice frame consists of four subframes is exemplified in FIG. 19, the present invention is not limited thereto. For example, if the voice frame consists of L subframes, a frame (i.e., $n^{th}$ frame) may be generated as described above by using one subframe in a previous frame (i.e., $(n-1)^{th}$ frame) and by using L subframes in a next frame (i.e., $(n+1)^{th}$ frame).

In this case, the interpolation described with reference to Equations 20 to 22 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to $1/p$.

Figure 20:
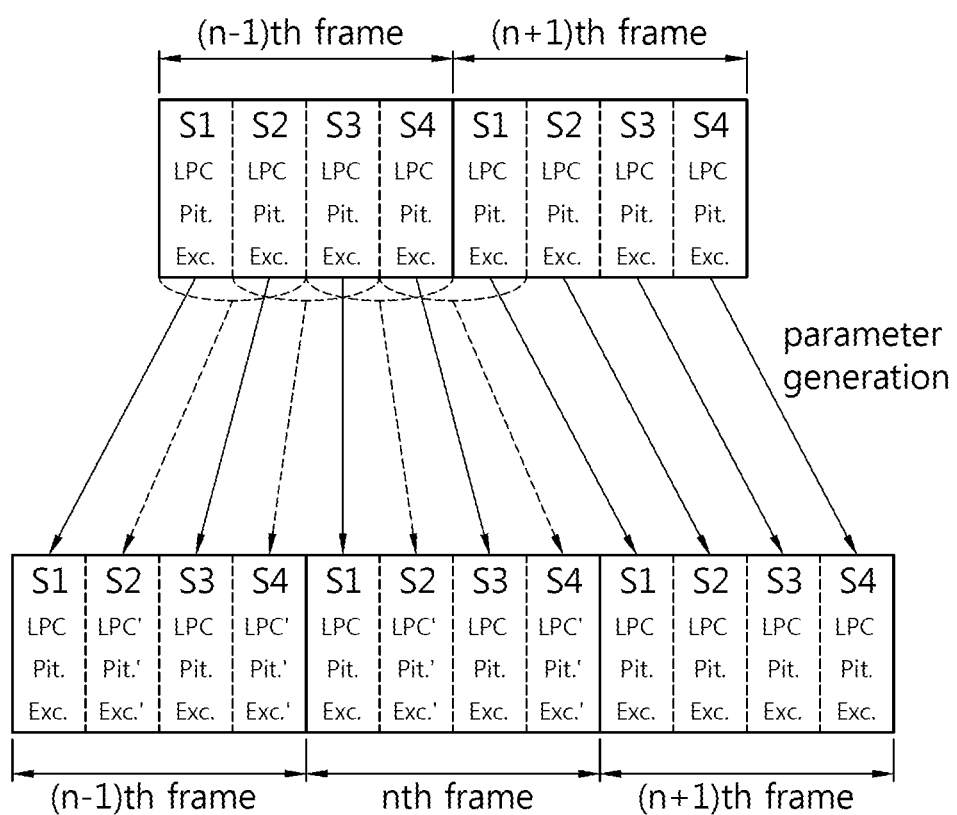

FIG. 20 is a schematic view showing another exemplary method of compensating for voice information in unit of a subframe at a decoding parameter level.

A case of applying the voice information compensation of the operation (B) is exemplified in FIG. 20. Therefore, by using decoding parameters of some subframes belonging to a next frame (i.e., $(n+1)^{th}$ frame) of a to-be-generated frame (i.e., $n^{th}$ frame) and decoding parameters of subframes belonging to a previous frame (i.e., $(n-1)^{th}$ frame), decoding parameters of subframes to be generated may be derived.

The example of FIG. 20 basically uses the same method as the example of FIG. 19, but a subframe and a decoding parameter are generated by using a subframe and a decode parameter different from those used in the example of FIG. 19.

More specifically, a new subframe is generated between a $1^{st}$ subframe S1 of a previous frame and a $2^{nd}$ subframe S1 of the previous frame, a new frame is generated between the $2^{nd}$ subframe S2 of the previous frame and a $3^{rd}$ subframe S2 of the previous frame, a new subframe is generated between the $3^{rd}$ subframe of the previous frame and a last subframe S4 of the previous frame, and a new subframe is generated between the last subframe S4 of the previous frame and a $1^{st}$ subframe S1 of a next frame. A decoding parameter of a subframe to be generated is derived from a decoding parameter of a subframe used in the generation.

A new frame may be configured by aggregating the generated subframes in unit of a frame. For example, if new subframes are generated between old subframes, a frame consisting of the old subframes and new subframes may be configured.

Equation 25 shows a method of interpolating and generating an ISP coefficient among decoding parameters, by compensating for voice information (or by generating voice information) according to the example of FIG. 20.

$$ISPn^-1_{m2}=0.5 \times ISPn^-1_1+0.5 \times ISPn^-1_2$$

$$ISPn^-1_{m4}=0.5 \times ISPn^-1_2+0.5 \times ISPn^-1_3$$

$$ISPn_{m2}=0.5 \times ISPn^-1_3+0.5 \times ISPn^-1_4$$

$$ISPn_{m4}=0.5 \times ISPn^-1_4+0.5 \times ISPn^+1_1 \quad <\text{Equation 25}>$$

Equation 25 may be applied equally to Equation 20, and only difference is that a subframe to which a to-be-modified decoding parameter belongs and a subframe to which a to-be-used decoding parameter belongs are different from those of Equation 20.

Equation 26 shows a method of interpolating and generating a pitch period among decoding parameters, by compensating for voice information (or by generating voice information) according to the example of FIG. 20.

$$Pn^-1_{m2}=0.5 \times Pn^-1_1+0.5 \times Pn^-1_2$$

$$Pn^-1_{m4}=0.5 \times Pn^-1_2+0.5 \times Pn^-1_3$$

$$Pn_{m2}=0.5 \times Pn^-1_3+0.5 \times Pn^-1_4$$

$$Pn_{m4}=0.5 \times Pn^-1_4+0.5 \times Pn^+1_1 \quad <\text{Equation 26}>$$

Equation 26 may be applied equally to Equation 21, and only difference is that a subframe to which a to-be-modified decoding parameter belongs and a subframe to which a to-be-used decoding parameter belongs are different from those of Equation 21.

Equation 27 shows a method of interpolating and generating an excitation signal component among decoding parameters, by compensating for voice information (or by generating voice information) according to the example of FIG. 20.

$$FCBn^-1_{m2}=0.5 \times FCBn^-1_1+0.5 \times FCBn^-1_2$$

$$FCBn^-1_{m4}=0.5 \times FCBn^-1_2+0.5 \times FCBn^-1_3$$

$$FCBn_{m2}=0.5 \times FCBn^-1_3+0.5 \times FCBn^-1_4$$

$$FCBn_{m4}=0.5 \times FCBn^-1_4+0.5 \times FCBn^+1_1 \quad <\text{Equation 27}>$$

Equation 27 may be applied equally to Equation 22, and only difference is that a subframe to which a to-be-modified decoding parameter belongs and a subframe to which a to-be-used decoding parameter belongs are different from those of Equation 22.

Equation 28 shows a method in which, in case of the excitation signal, instead of being generated by using the interpolation, an excitation signal component of subframes used in the generation is used as a first-half component and a second-half component of the excitation signal component for a subframe to be generated, by compensating for voice information (or by generating voice information) according to the example of FIG. 20.

$$FCBn^-1_{m2}(k)=FCBn^-1_1(k)(k=0 \sim \text{subframe}/2)$$

$$=FCBn^-1_2(k)(k=\text{subframe}/2 \sim \text{subframe})$$

$$FCBn^-1_{m4}(k)=FCBn^-1_2(k)(k=0 \sim \text{subframe}/2)$$

$$=FCBn^-1_3(k)(k=\text{subframe}/2 \sim \text{subframe})$$

$$FCBn_{m2}(k)=FCBn^-1_3(k)(k=0 \sim \text{subframe}/2)$$

$$=FCBn^-1_4(k)(k=\text{subframe}/2 \sim \text{subframe})$$

$$FCBn^-1_{m4}(k) = FCBn^-1_4(k)(k=0 \sim subframe/2)$$

$$= FCBn^+1_1(k)(k=subframe/2 \sim subframe) \quad \text{<Equation 28>}$$

Equation 28 may be applied equally to Equation 23, and only difference is that a subframe to which a to-be-modified decoding parameter belongs and a subframe to which a to-be-used decoding parameter belongs are different from those of Equation 23.

Equation 29 shows a method of generating an excitation signal component by using an excitation signal component of an existing subframe in unit of a track, by compensating for voice information (or by generating voice information) according to the example of FIG. 20.

$$FCBn^-1_{m2}(k) = FCBn^-1_1(k)(\text{track 1 \& 3}) + FCBn^-1_2(k) \text{ (track 2 \& 4)}$$

$$FCBn^-1_{m4}(k) = FCBn^-1_2(k)(\text{track 1 \& 3}) + FCBn^-1_3(k) \text{ (track 2 \& 4)}$$

$$FCBn_{m2}(k) = FCBn^-1_3(k)(\text{track 1 \& 3}) + FCBn^-1_4(k) \text{ (track 2 \& 4)}$$

$$FCBn_{m4}(k) = FCBn^-1_4(k)(\text{track 1 \& 3}) + FCBn^+1_1(k) \text{ (track 2 \& 4)} \quad \text{<Equation 29>}$$

Equation 29 may be applied equally to Equation 24, and only difference is that a subframe to which a to-be-modified decoding parameter belongs and a subframe to which a to-be-used decoding parameter belongs are different from those of Equation 24.

Although a case where a voice frame consists of four subframes is exemplified in FIG. 20, the present invention is not limited thereto. For example, if the voice frame consists of L subframes, a frame (i.e., $n^{th}$ frame) may be generated as described above by using one subframe in a next frame (i.e., (n+1) frame) and by using L subframes in a previous frame (i.e., $(n-1)^{th}$ frame).

In this case, the interpolation described with reference to Equations 25 to 27 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to 1/p.

Figure 21:
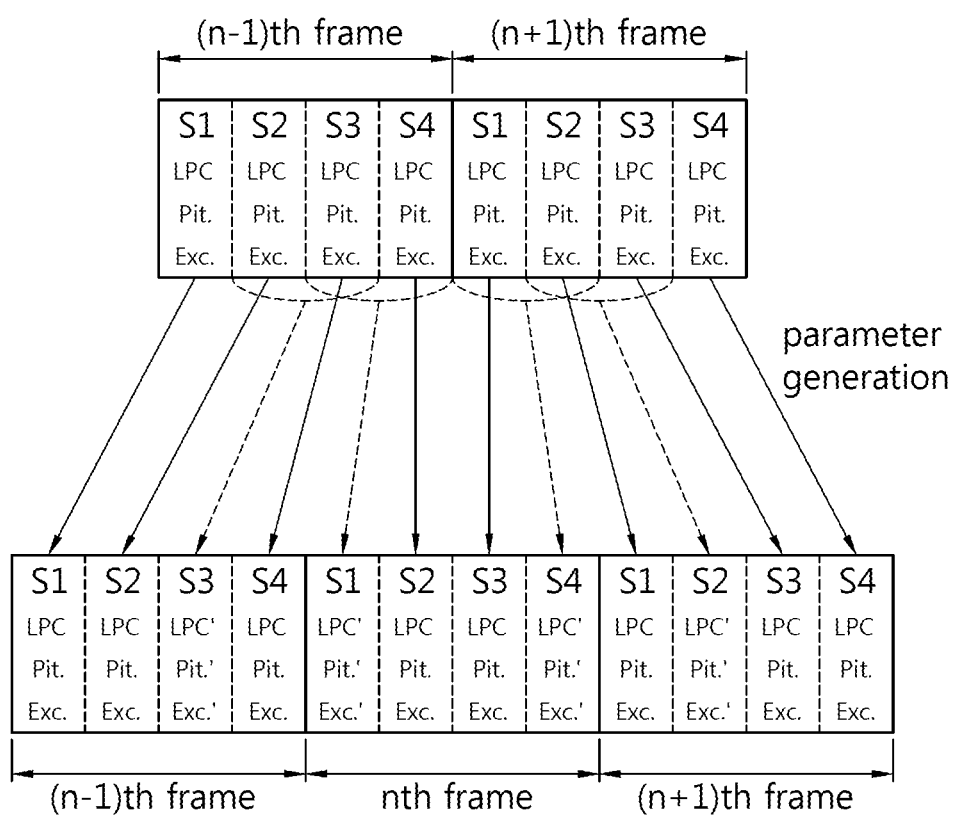

FIG. 21 is a schematic view showing another exemplary method of compensating for voice information in unit of a subframe at a decoding parameter level.

A case of applying the voice information compensation of the operation (C) is exemplified in FIG. 21. Therefore, by using decoding parameters of some subframes belonging to a previous frame (i.e., $(n-1)^{th}$ frame) of a to-be-generated frame (i.e., $n^{th}$ frame) and decoding parameters of some subframes belonging to a next frame (i.e., $(n+1)^{th}$ frame), decoding parameters of subframes to be generated may be derived.

The example of FIG. 21 basically uses the same method as the examples of FIG. 19 and FIG. 20, but a subframe and a decoding parameter are generated by using a subframe and a decode parameter different from those used in the examples of FIG. 19 and FIG. 20.

More specifically, a new subframe is generated between a $2^{nd}$ subframe S2 of a previous frame and a $3^{rd}$ subframe S3 of the previous frame, a new subframe is generated between the $3^{rd}$ subframe S3 of the previous frame and a $4^{th}$ subframe S4 of the previous frame, a new subframe is generated between a $1^{st}$ subframe S1 of a next frame and a $2^{nd}$ subframe S2 of the next frame, and a new subframe is generated between a $2^{nd}$ subframe S2 of the next frame and a $3^{rd}$ subframe S3 of the next frame. A decoding parameter of a subframe to be generated is derived from a decoding parameter of a subframe used in the generation.

The jitter buffer may configure a new frame by aggregating the generated subframes in unit of a frame. For example, if new subframes are generated between old subframes, a frame consisting of the old subframes and new subframes may be configured.

Equation 30 shows a method of interpolating and generating an ISP coefficient among decoding parameters, by compensating for voice information (or by generating voice information) according to the example of FIG. 21.

$$ISPn^-1_{m3} = 0.5 \times ISPn^-1_2 + 0.5 \times ISPn^-1_3$$

$$ISPn_{m1} = 0.5 \times ISPn^-1_3 + 0.5 \times ISPn^-1_4$$

$$ISPn_{m4} = 0.5 \times ISPn^+1_1 + 0.5 \times ISPn^+1_2$$

$$ISPn^+1_{m2} = 0.5 \times ISPn^+1_2 + 0.5 \times ISPn^+1_3 \quad \text{<Equation 30>}$$

Equation 30 may be applied equally to Equation 20, and only difference is that a subframe to which a to-be-modified decoding parameter belongs and a subframe to which a to-be-used decoding parameter belongs are different from those of Equation 20.

Equation 31 shows a method of interpolating and generating a pitch period among decoding parameters, by compensating for voice information (or by generating voice information) according to the example of FIG. 21.

$$Pn^-1_{m3} = 0.5 \times Pn^-1_2 + 0.5 \times Pn^-1_3$$

$$Pn_{m1} = 0.5 \times Pn^-1_3 + 0.5 \times Pn^-1_4$$

$$Pn_{m4} = 0.5 \times Pn^+1_1 + 0.5 \times Pn^+1_2$$

$$Pn^+1_{m2} = 0.5 \times Pn^+1_2 + 0.5 \times Pn^+1_3 \quad \text{<Equation 31>}$$

Equation 31 may be applied equally to Equation 21, and only difference is that a subframe to which a to-be-modified decoding parameter belongs and a subframe to which a to-be-used decoding parameter belongs are different from those of Equation 21.

Equation 32 shows a method of interpolating and generating an excitation signal component among decoding parameters, by compensating for voice information (or by generating voice information) according to the example of FIG. 21.

$$FCBn^-1_{m3} = 0.5 \times FCBn^-1_2 + 0.5 \times FCBn^-1_3$$

$$FCBn_{m1} = 0.5 \times FCBn^-1_3 + 0.5 \times FCBn^-1_4$$

$$FCBn_{m4} = 0.5 \times FCBn^+1_1 + 0.5 \times FCBn^+1_2$$

$$FCBn^+1_{m2} = 0.5 \times FCBn^+1_2 + 0.5 \times FCBn^+1_3 \quad \text{<Equation 32>}$$

Equation 32 may be applied equally to Equation 22, and only difference is that a subframe to which a to-be-modified decoding parameter belongs and a subframe to which a to-be-used decoding parameter belongs are different from those of Equation 22.

Equation 33 shows a method in which, in case of the excitation signal, instead of being generated by using the interpolation, an excitation signal component of subframes used in the generation is used as a first-half component and a second-half component of the excitation signal component for a subframe to be generated, by compensating for voice information (or by generating voice information) according to the example of FIG. 21.

$$FCBn^-1_{m3}(k) = FCBn^-1_2(k)(k=0\sim subframe/2)$$

$$= FCBn^-1_3(k)(k=subframe/2\sim subframe)$$

$$FCBn_{m1}(k) = FCBn^-1_3(k)(k=0\sim subframe/2)$$

$$= FCBn^-1_4(k)(k=subframe/2\sim subframe)$$

$$FCBn_{m4}(k) = FCBn^+1_1(k)(k=0\sim subframe/2)$$

$$= FCBn^+1_2(k)(k=subframe/2\sim subframe)$$

$$FCBn^+1_{m2}(k) = FCBn^+1_2(k)(k=0\sim subframe/2)$$

$$= FCBn^+1_3(k)(k=subframe/2\sim subframe) \quad <\text{Equation 33}>$$

Equation 33 may be applied equally to Equation 23, and only difference is that a subframe to which a to-be-modified decoding parameter belongs and a subframe to which a to-be-used decoding parameter belongs are different from those of Equation 23.

Equation 34 shows a method of generating an excitation signal component by using an excitation signal component of an existing subframe in unit of a track, by compensating for voice information (or by generating voice information) according to the example of FIG. 21.

$$FCBn^-1_{m3}(k) = FCBn^-1_2(k)(\text{track 1 \& 3}) + FCBn^-1_3(k) \\ (\text{track 2 \& 4})$$

$$FCBn_{m1}(k) = FCBn^-1_3(k)(\text{track 1 \& 3}) + FCBn^-1_4(k) \\ (\text{track 2 \& 4})$$

$$FCBn_{m4}(k) = FCBn^+1_1(k)(\text{track 1 \& 3}) + FCBn^+1_2(k) \\ (\text{track 2 \& 4})$$

$$FCBn^+1_{m2}(k) = FCBn^+1_2(k)(\text{track 1 \& 3}) + FCBn^+1_3(k) \\ (\text{track 2 \& 4}) \quad <\text{Equation 34}>$$

Equation 34 may be applied equally to Equation 24, and only difference is that a subframe to which a to-be-modified decoding parameter belongs and a subframe to which a to-be-used decoding parameter belongs are different from those of Equation 24.

Although a case where a voice frame consists of four subframes is described as an example in FIG. 21, the present invention is not limited thereto. For example, a frame (i.e., $n^{th}$ frame) may be generated as described above by using subframes of a next frame (i.e., $(n+1)^{th}$ frame) and a previous frame (i.e., $(n-1)^{th}$ frame).

In this case, the interpolation described with reference to Equations 30 to 32 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to 1/p.

Figure 22:
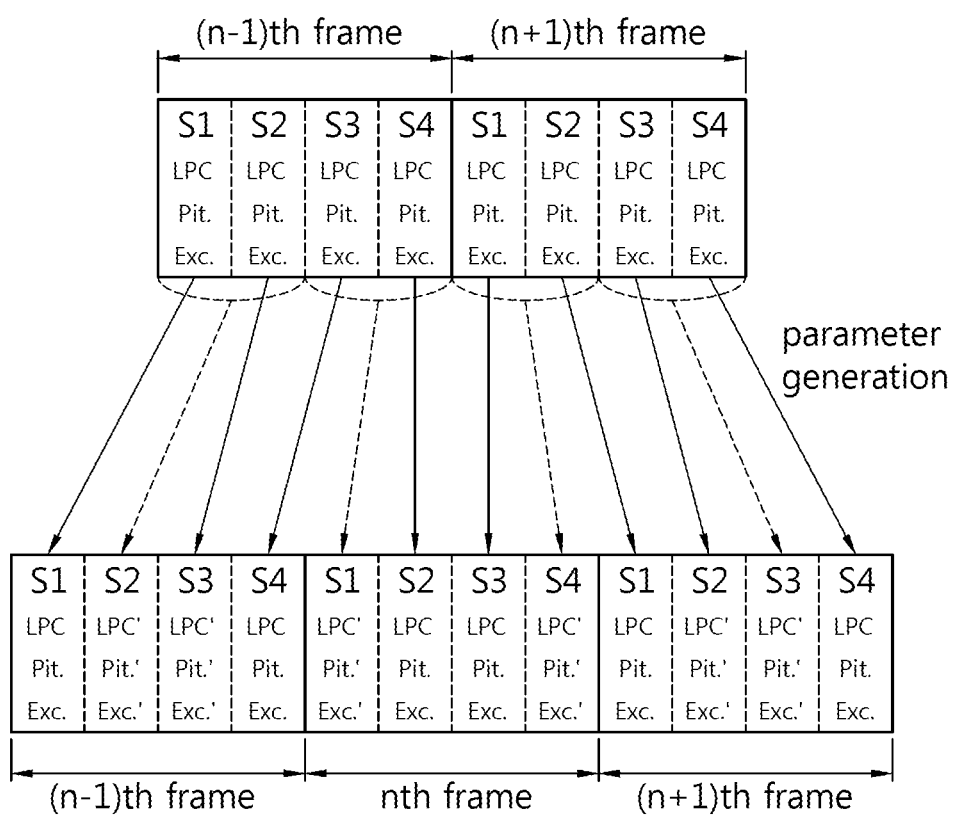

FIG. 22 is a schematic view showing another exemplary method of compensating for voice information in unit of a subframe at a decoding parameter level.

A case of applying the voice information compensation of the operation (D) is exemplified in FIG. 22. Therefore, by using decoding parameters of subframes belonging to a previous frame (i.e., $(n-1)^{th}$ frame) of a to-be-generated frame (i.e., $n^{th}$ frame) and decoding parameters of subframes belonging to a next frame (i.e., (n+1) frame), decoding parameters of subframes to be generated may be derived.

The example of FIG. 22 basically uses the same method as the examples of FIG. 19 to FIG. 21, but a subframe and a decoding parameter are generated by using a subframe and a decode parameter different from those used in the examples of FIG. 19 to FIG. 21.

More specifically, a new subframe is generated between a $1^{st}$ subframe S1 of a previous frame and a $2^{nd}$ subframe S2 of the previous frame, a new subframe is generated between a $3^{rd}$ subframe S3 of the previous frame and a $4^{th}$ subframe S4 of the previous frame, a new subframe is generated between a $1^{st}$ subframe S1 of a next frame and a $2^{nd}$ subframe S2 of the next frame, and a new subframe is generated between a $3^{rd}$ subframe S3 of the next frame and a last subframe S4 of the next frame. A decoding parameter of a subframe to be generated is derived from a decoding parameter of a subframe used in the generation.

The jitter buffer may configure a new frame by aggregating the generated subframes in unit of a frame. For example, if new subframes are generated between old subframes, a frame consisting of the old subframes and new subframes may be configured.

Equation 35 shows a method of interpolating and generating an ISP coefficient among decoding parameters, by compensating for voice information (or by generating voice information) according to the example of FIG. 22.

$$ISPn^-1_{m2} = 0.5 \times ISPn^-1_1 + 0.5 \times ISPn^-1_2$$

$$ISPn_{m1} = 0.5 \times ISPn^-1_3 + 0.5 \times ISPn^-1_4$$

$$ISPn_{m4} = 0.5 \times ISPn^+1_1 + 0.5 \times ISPn^+1_2$$

$$ISPn^+1_{m3} = 0.5 \times ISPn^+1_3 + 0.5 \times ISPn^+1_4 \quad <\text{Equation 35}>$$

Equation 35 may be applied equally to Equation 22, and only difference is that a subframe to which a to-be-modified decoding parameter belongs and a subframe to which a to-be-used decoding parameter belongs are different from those of Equation 22.

Equation 36 shows a method of interpolating and generating a pitch period among decoding parameters, by compensating for voice information (or by generating voice information) according to the example of FIG. 22.

$$Pn^-1_{m2} = 0.5 \times Pn^-1_1 + 0.5 \times Pn^-1_2$$

$$Pn_{m1} = 0.5 \times Pn^-1_3 + 0.5 \times Pn^-1_4$$

$$Pn_{m4} = 0.5 \times Pn^+1_1 + 0.5 \times Pn^+1_2$$

$$Pn^+1_{m3} = 0.5 \times Pn^+1_3 + 0.5 \times Pn^+1_4 \quad <\text{Equation 36}>$$

Equation 36 may be applied equally to Equation 21, and only difference is that a subframe to which a to-be-modified decoding parameter belongs and a subframe to which a to-be-used decoding parameter belongs are different from those of Equation 21.

Equation 37 shows a method of interpolating and generating an excitation signal component among decoding parameters, by compensating for voice information (or by generating voice information) according to the example of FIG. 22.

$$FCBn^-1_{m2} = 0.5 \times FCBn^-1_1 + 0.5 \times FCBn^-1_2$$

$$FCBn_{m1} = 0.5 \times FCBn^-1_3 + 0.5 \times FCBn^-1_4$$

$$FCBn_{m4} = 0.5 \times FCBn^+1_1 + 0.5 \times FCBn^+1_2$$

$$FCBn^+1_{m3} = 0.5 \times FCBn^+1_3 + 0.5 \times FCBn^+1_4 \quad <\text{Equation 37}>$$

Equation 37 may be applied equally to Equation 22, and only difference is that a subframe to which a to-be-modified decoding parameter belongs and a subframe to which a to-be-used decoding parameter belongs are different from those of Equation 22.

Equation 38 shows a method in which, in case of the excitation signal, instead of being generated by using the interpolation, an excitation signal component of subframes used in the generation is used as a first-half component and a second-half component of the excitation signal component for a subframe to be generated, by compensating for voice information (or by generating voice information) according to the example of FIG. 22.

$$FCBn^-1_{m2}(k)=FCBn^-1_1(k)(k=0\sim subframe/2)$$

$$=FCBn^-1_2(k)(k=subframe/2\sim subframe)$$

$$FCBn_{m1}(k)=FCBn^-1_3(k)(k=0\sim subframe/2)$$

$$=FCBn^-1_4(k)(k=subframe/2\sim subframe)$$

$$FCBn_{m4}(k)=FCBn^+1_1(k)(k=0\sim subframe/2)$$

$$=FCBn^+1_2(k)(k=subframe/2\sim subframe)$$

$$FCBn^+1_{m3}(k)=FCBn^+1_3(k)(k=0\sim subframe/2)$$

$$=FCBn^+1_4(k)(k=subframe/2\sim subframe) \qquad \text{<Equation 38>}$$

Equation 38 may be applied equally to Equation 24, and only difference is that a subframe to which a to-be-modified decoding parameter belongs and a subframe to which a to-be-used decoding parameter belongs are different from those of Equation 24.

Equation 39 shows a method of generating an excitation signal component by using an excitation signal component of an existing subframe in unit of a track, by compensating for voice information (or by generating voice information) according to the example of FIG. 22.

$$FCBn^-1_{m2}(k)=FCBn^-1_1(k)(\text{track 1 \& 3})+FCBn^-1_2(k) \\ (\text{track 2 \& 4})$$

$$FCBn_{m1}(k)=FCBn^-1_3(k)(\text{track 1 \& 3})+FCBn^-1_4(k) \\ (\text{track 2 \& 4})$$

$$FCBn_{m4}(k)=FCBn^+1_1(k)(\text{track 1 \& 3})+FCBn^+1_2(k) \\ (\text{track 2 \& 4})$$

$$FCBn^+1_{m3}(k)=FCBn^+1_3(k)(\text{track 1 \& 3})+FCBn^+1_4(k) \\ (\text{track 2 \& 4}) \qquad \text{<Equation 39>}$$

Equation 39 may be applied equally to Equation 24, and only difference is that a subframe to which a to-be-modified decoding parameter belongs and a subframe to which a to-be-used decoding parameter belongs are different from those of Equation 24.

Although a case where a voice frame consists of four subframes is described as an example in FIG. 22, the present invention is not limited thereto. For example, a frame (i.e., $n^{th}$ frame) may be generated as described above by using a decoding parameter and a subframe of a next frame (i.e., $(n+1)^{th}$ frame) and a decoding parameter and a subframe of a previous frame (i.e., $(n-1)^{th}$ frame).

In this case, the interpolation described with reference to Equations 35 to 37 may also be performed by using p subframes (i.e., decoding parameters of the subframe)(where $2 \leq p \leq L$). In this case, a filter coefficient of the interpolation (i.e., smoothing ratio) may be determined according to the number of subframes (i.e., decoding parameters of the subframe) used in the interpolation, instead of being determined to 0.5 used for a case where two subframes are applied. For example, if the p subframes are used, the smoothing ratio may be determined to 1/p.

Meanwhile, although a case where an ISP coefficient is used as a decoding parameter related to an LPC coefficient is described for example in the aforementioned description, the present invention is not limited thereto. For example, an interpolation method for the ISP coefficient may equally apply to the LSP coefficient together with the aforementioned ISP coefficient, and may also apply to the ISF coefficient and the LSF coefficient by considering a transformation to a frequency domain.

Although methods of the aforementioned exemplary embodiments have been described on the basis of a flowchart in which steps or blocks are listed in sequence, the steps of the present invention are not limited to a certain order. Therefore, a certain step may be performed in a different step or in a different order or concurrently with respect to that described above. In addition, the aforementioned exemplary embodiments include various aspects of examples. For example, the aforementioned embodiments may be performed in combination, and this is also included in the embodiments of the present invention. All replacements, modifications and changes should fall within the spirit and scope of the claims of the present invention.

The invention claimed is:

1. A method of managing a jitter buffer, the method comprising:
   receiving, by a decoding apparatus, quantized parameter information for an audio signal;
   deriving, by the decoding apparatus, a decoding parameter based on the quantized parameter information;
   restoring, by the decoding apparatus, the audio signal including a voice frame based on the decoding parameter;
   delivering, by the decoding apparatus, the voice frame to a jitter buffer; and
   performing, by the jitter buffer, a jitter buffer adjustment on the basis of the voice frame,
   wherein the jitter buffer adjustment comprises a compensation for the audio signal,
   wherein the compensation for the audio signal is performed in unit of a subframe of the voice frame,
   wherein the compensation for the audio signal is performed based on an importance level of the voice frame,
   wherein a first importance level of a voice frame in a front side of the jitter buffer is higher than a second importance level of a voice frame in a single silent duration, and
   wherein the second importance level of a voice frame in a single silent duration is higher than a third importance level of a voice frame positioned within consecutive silent durations.

2. The method of claim 1, wherein the compensation for the audio signal is performed at a decoding parameter level of the audio signal, wherein the decoding parameter level is an intermediary level between information of a bit-stream level and a restored audio signal.

3. The method of claim 1, wherein the jitter buffer adjustment comprises an adjustment size of the jitter buffer.

4. The method of claim 3,
   wherein the audio signal becomes a target of the audio signal compensation in an ascending order of importance level.

5. The method of claim 1, wherein if a frame decimation is performed as the compensation for the audio signal, as to a decimation target frame, a previous frame of the decimation target frame, and a next frame of the decimation target frame, decoding parameters for first-half subframes of the decimation target frame are replaced with decoding parameters for second-half subframes of the previous frame, and decoding parameters for second-half subframes of the decimation target frame are replaced with decoding parameters for first-half subframes of the next frame, thereby decimating the decimation target frame.

6. The method of claim 1, wherein if a frame decimation is performed as the compensation for the audio signal, a new decoding parameter of a subframe is generated by interpolating decoding parameters for two subframes constituting a voice frame.

7. The method of claim 1, wherein if a frame decimation is performed as the compensation for the audio signal, as to a decimation target frame, a first neighboring frame which is a previous frame of the decimation target frame, and a second neighboring frame which is a next frame of the decimation target frame, the compensation for the audio signal is performed to generate a compensated first neighboring frame and a compensated second neighboring frame, decoding parameters for second-half first subframes of the compensated first neighboring frame are generated by interpolating decoding parameters for the second-half subframes of the first neighboring frame, decoding parameters for second-half second subframes of the compensated first neighboring frame are generated by interpolating decoding parameters for first-half subframes of the decimation target frame, decoding parameters for first-half subframes of the compensated second neighboring frame are generated by interpolating decoding parameters for second-half subframes of the decimation target frame, and decoding parameters for first-half second subframes of the compensated second neighboring frame are generated by interpolating decoding parameters for first-half subframes of the second neighboring frame.

8. The method of claim 1, wherein if a frame decimation is performed as the compensation for the audio signal, as to a decimation target frame and a previous frame of the decimation target frame, the compensation for the audio signal is performed to generate a compensated previous frame, a first subframe of the compensated previous frame is generated by interpolating decoding parameters for first-half subframes of the previous frame, a second subframe of the compensated previous frame is generated by interpolating decoding parameters for second-half subframes of the previous frame, a third subframe of the compensated previous frame is generated by interpolating decoding parameters for first-half subframes of the decimation target frame, and a fourth subframe of the compensated previous frame is generated by interpolating decoding parameters of second-half subframes of the decimation target frame.

9. The method of claim 1, wherein if a frame decimation is performed as the compensation for the audio signal, as to a decimation target frame and a next frame of the decimation target frame, a compensated next frame is generated by compensating for the audio signal, a first subframe of the compensated next frame is generated by interpolating decoding parameters for first-half subframes of the decimation target frame, a second subframe of the compensated next frame is generated by interpolating decoding parameters for second-half subframes of the decimation target frame, a third subframe of the compensated next frame is generated by interpolating decoding parameters for first-half subframes of the next frame, and a fourth subframe of the compensated next frame is generated by interpolating decoding parameters for second-half subframes of the next frame.

10. The method of claim 1, wherein if a frame decimation is performed as the compensation for the audio signal, a decoding parameter of a new subframe is generated by interpolating decoding parameters for two subframes constituting a voice frame.

11. The method of claim 1,
wherein if a frame decimation is performed as the compensation for the audio signal, a subframe interpolation is performed, and
wherein the subframe interpolation comprises:
generating a new subframe between two subframes constituting a voice frame, and
generating a decoding parameter of the new subframe by interpolating decoding parameters for the two subframes.

12. The method of claim 11, wherein the subframe interpolation is performed on four subframe pairs consisting of neighboring subframes among four subframes of a first frame and a first subframe of a second frame.

13. The method of claim 11, wherein the subframe interpolation is performed on four subframe pairs consisting of neighboring subframes among four subframes of a first frame and four subframes of a second frame.

14. The method of claim 11, wherein the subframe interpolation is performed on second and third subframes of a first frame, third and fourth subframes of the first frame, first and second subframes of a second frame, and second and third subframes of the second frame.

15. The method of claim 11, wherein the subframe interpolation is performed on first and second subframes of a first frame, third and fourth subframes of the first frame, first and second subframes of a second frame, and third and fourth subframes of the second frame.

* * * * *